United States Patent
Hu et al.

(10) Patent No.: US 8,718,031 B2
(45) Date of Patent: May 6, 2014

(54) MULTI-NETWORK ACCESS CONTROL METHOD, COMMUNICATION SYSTEM, AND RELEVANT DEVICES

(75) Inventors: Ying Hu, Shenzhen (CN); Shanshan Wang, Shanghai (CN); Ningshen Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 13/243,142

(22) Filed: Sep. 23, 2011

(65) Prior Publication Data

US 2012/0250616 A1 Oct. 4, 2012

Related U.S. Application Data

(63) Continuation of application No. PCT/CN2010/071147, filed on Mar. 19, 2010.

(30) Foreign Application Priority Data

Apr. 21, 2009 (CN) .......................... 2009 1 0135550

(51) Int. Cl.
*H04W 4/00* (2009.01)
(52) U.S. Cl.
USPC .......................................................... 370/341
(58) Field of Classification Search
USPC .................. 370/310–350, 431–463
See application file for complete search history.

(56) References Cited

U.S. PATENT DOCUMENTS

| 6,697,811 B2 * | 2/2004 | Brodsky ................................. 1/1 |
| 2006/0073831 A1 | 4/2006 | Guyot et al. |
| 2006/0264217 A1 | 11/2006 | Shaheen |
| 2007/0264994 A1 | 11/2007 | Schwarz et al. |
| 2007/0268840 A1 * | 11/2007 | Njedjou et al. ................ 370/254 |
| 2007/0297439 A1 * | 12/2007 | Ihattula .......................... 370/445 |
| 2009/0047947 A1 | 2/2009 | Giaretta et al. |
| 2009/0264131 A1 * | 10/2009 | Wu et al. ........................ 455/436 |
| 2010/0104036 A1 * | 4/2010 | Liao et al. ...................... 375/260 |

(Continued)

FOREIGN PATENT DOCUMENTS

| CN | 1866889 A | 11/2006 |
| CN | 101127652 A | 2/2007 |

(Continued)

OTHER PUBLICATIONS

Extended European Search Report issued in corresponding European Patent Application No. 10766601.8, mailed Jan. 16, 2012.

(Continued)

*Primary Examiner* — Fan Ng
(74) *Attorney, Agent, or Firm* — Brinks Gilson & Lione

(57) ABSTRACT

Embodiments of the present invention disclose a multi-network access control method, a communication system, and relevant devices to prevent interruption of normal network communication when the multi-access function is used. The method includes the following steps: A User Equipment (UE) receives multi-access indication information sent by a network device; the UE judges, according to the multi-access indication information, whether the UE uses a multi-access function; and the UE initiates an access connectivity establishment from multi-networks if the multi-access function is used. The embodiments of the present invention further provide a communication system and relevant devices. The embodiments of the present invention may prevent interruption of normal network communication when the multi-access function is used.

12 Claims, 16 Drawing Sheets

(56) References Cited

U.S. PATENT DOCUMENTS

| | | | | |
|---|---|---|---|---|
| 2010/0112976 A1* | 5/2010 | Turina | | 455/404.1 |
| 2010/0303031 A1* | 12/2010 | Rune | | 370/329 |
| 2011/0040855 A1* | 2/2011 | Miklos et al. | | 709/220 |
| 2011/0110300 A1* | 5/2011 | Sachs et al. | | 370/328 |
| 2011/0128907 A1* | 6/2011 | Kvernvik | | 370/328 |
| 2012/0113968 A1* | 5/2012 | Zhou et al. | | 370/338 |
| 2012/0269182 A1* | 10/2012 | Walker | | 370/338 |

FOREIGN PATENT DOCUMENTS

| | | |
|---|---|---|
| CN | 101015174 A | 8/2007 |
| CN | 101019379 A | 8/2007 |
| JP | 20040523987 A | 8/2004 |
| JP | 2005536091 A | 11/2005 |
| JP | 2008516500 A | 5/2008 |
| JP | 2008541669 A | 11/2008 |
| JP | 2010535456 A | 11/2010 |
| WO | WO 2006/030116 A1 | 3/2006 |
| WO | WO 2006/124840 A1 | 11/2006 |
| WO | WO 2007058024 A1 | 5/2007 |
| WO | WO 2007148252 A2 | 12/2007 |
| WO | WO 2009/018533 A2 | 2/2009 |

OTHER PUBLICATIONS

LTE, "3$^{rd}$ Generation Partnership Project; Technical Specification Group Services and System Aspects; Multi Access PDN Connectivity and IP Flow Mobility" (Release 9) 3GPP TR 23.861. V1.1.1, Apr. 2009.

LTE, "3$^{rd}$ Generation Partnership Project; Technical Specification Group Services and System Aspects; General Packet Radio Service (GPRS) Enhancements for Evolved Universal Terrestrial Radio Access Network (E-UTRAN) Access" (Release 9) 3GPP TS 23.401. V9.0.0, Mar. 2009.

Huawei, "Simultaneous Attachment to Non-3GPP Access and then to 3GPP Access for Solution A" 7.7, 3GPP TSG SA WG2 Meeting #72. Hangzhou, China, Mar. 30-Apr. 3, 2009. TD S2-092214.

Huawei, "Simultaneous Attachment: PMIP Solution B New Attach Type" 7.7, 3GPP TSG WG2 Meeting #72. Hangzhou, China, Mar. 30-Apr. 3, 2009. TD S2-092215.

Huawei, "Simultaneous Attachment: New Attach Type" 7.7, 3GPP TSG WG2 Meeting #72. Hangzhou, China, Mar. 30-Apr. 3, 2009. TD S2-092213.

Office Action issued in corresponding Chinese Patent Application No. 200910135550.3, mailed Jul. 4, 2012.

Written Opinion of the International Searching Authority issued in corresponding PCT Patent Application No. PCT/CN2010/071147, mailed Jul. 1, 2010.

International Search Report issued in corresponding PCT Patent Application No. PCT/CN2010/071147, mailed Jul. 1, 2010.

Office Action issued in corresponding Japanese Patent Application No. 2012-506316, mailed Mar. 5, 2013.

Ericsson, "PDN GW Selection for Multiple PDN Connections with S2a" Agenda Item 8.4.2, 3GPP TSG SA WG2 Meeting #61. Ljubljana, Slovenia, Nov. 12-16, 2007. TD S2-075174.

Office Action issued in corresponding Chinese Patent Application No. 200910135550.3, mailed Apr. 2, 2013.

* cited by examiner

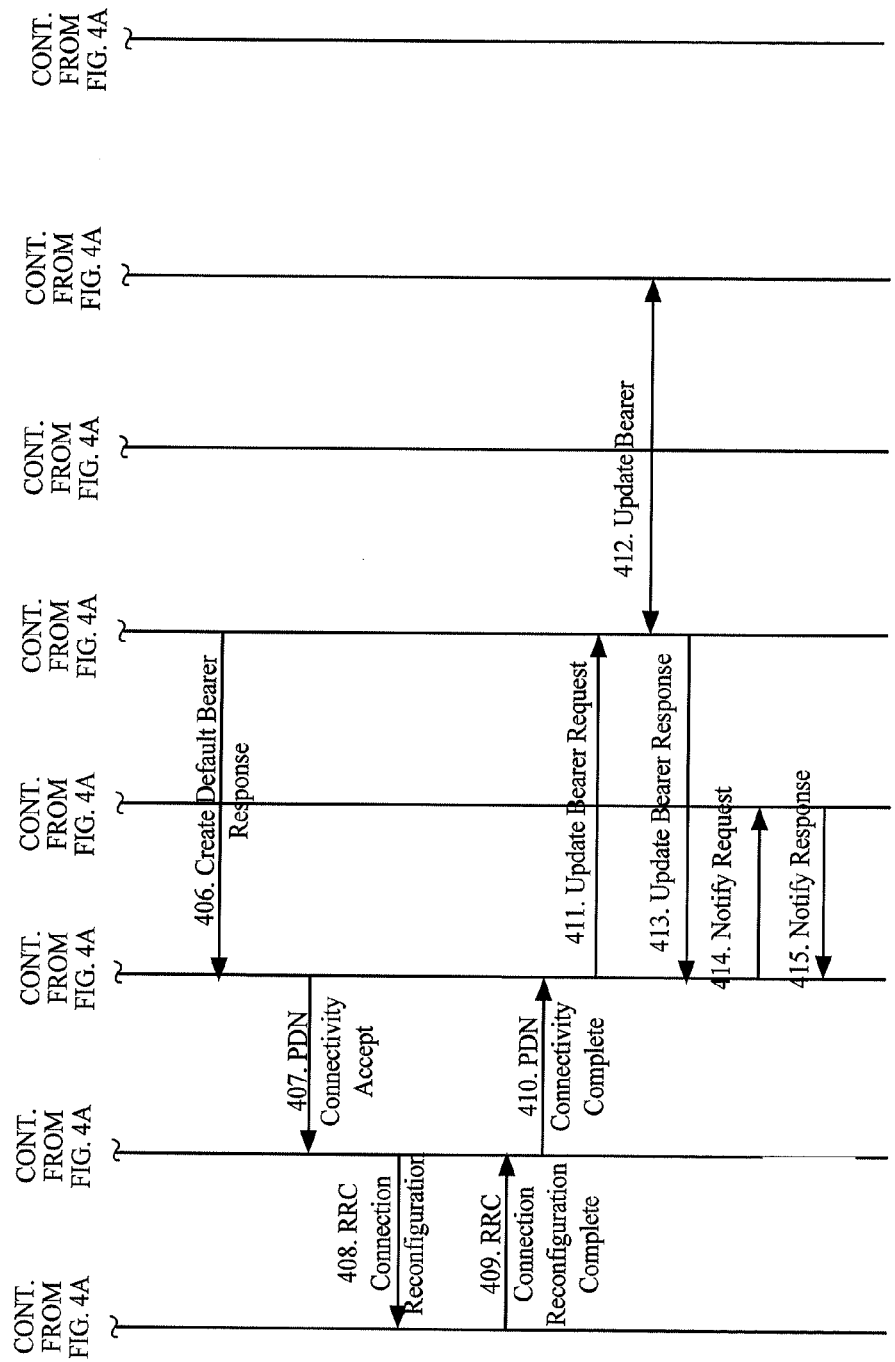

MULTI-NETWORK ACCESS CONTROL METHOD, COMMUNICATION SYSTEM, AND RELEVANT DEVICES

CROSS-REFERENCE TO RELATED APPLICATIONS

This application is a continuation of International Application No. PCT/CN2010/071147, filed on Mar. 19, 2010, which claims priority to Chinese Patent Application No. 200910135550.3, filed on Apr. 21, 2009, both of which are hereby incorporated by reference in their entireties.

FIELD OF THE INVENTION

The present invention relates to the communication field, and in particular, to a multi-network access control method, a communication system, and relevant devices.

BACKGROUND OF THE INVENTION

When a multi-access-enabled User Equipment (UE) moves from a non-$3^{rd}$ Generation Partnership Project (non-3GPP) network to an area covered by both a non-3GPP network and a 3GPP network, if the UE intends to switch part of services to the 3GPP network and retain the remaining services in the non-3GPP network, the UE initiates connection establishment in the 3GPP network. For example, a multi-access-enabled UE has a Packet Data Network (PDN) connection, and accesses the PDN through a PDN Gateway (PGW). If the UE intends to switch part of services of the PDN connection to the 3GPP network, the UE establishes a new PDN connection in the 3GPP network. If the PGW does not support the multi-access function, the PGW releases resources related to the PDN connection between the UE and the PGW. Consequently, the services not switched to the 3GPP network on the PDN connection are interrupted when the UE uses the multi-access function, and the normal network communication is affected.

SUMMARY OF THE INVENTION

Embodiments of the present invention provide a multi-network access control method, a communication system, and relevant devices to prevent interruption of normal network communication when the multi-access function is used.

An embodiment of the present invention provides a multi-network access control method, including: receiving, by a UE, multi-access indication information sent by a network device; judging, by the UE, according to the multi-access indication information, whether the UE uses a multi-access function; and initiating, by the UE, an access connectivity establishment from multi-networks if the multi-access function is used.

An embodiment of the present invention provides a multi-network access control method, including: receiving, by a network device, a request message sent by a UE; obtaining, by the network device, information about multi-access capability of each data gateway; and selecting, by the network device, according to the information about multi-access capability of each data gateway, a multi-access-enabled data gateway to serve the UE.

An embodiment of the present invention provides a communication system, including: a network device, configured to obtain multi-access indication information, and send the multi-access indication information to a UE; and the UE, configured to receive the multi-access indication information sent by the network device, judge, according to the multi-access indication information, whether the UE uses a multi-access function, and initiate an access connectivity establishment request from multi-networks if the multi-access function is used.

An embodiment of the present invention provides a communication system, including: a network device, configured to receive a request message sent by a UE, obtain information about multi-access capability of each data gateway, and select, according to the information about multi-access capability of each data gateway, a multi-access-enabled data gateway to serve the UE; a data gateway, configured to provide the information about multi-access capability of the data gateway to the network device; and the UE, configured to send the request message to the network device.

An embodiment of the present invention provides a network device, including: an obtaining unit, configured to obtain multi-access indication information; and a sending unit, configured to send the multi-access indication information to a UE, where the multi-access indication information indicates whether the UE is allowed to use a multi-access function.

An embodiment of the present invention provides a network device, including: a request receiving unit, configured to receive a request message sent by a UE; an information obtaining unit, configured to obtain information about multi-access capability of each data gateway; and a selecting unit, configured to select, according to the information about multi-access capability of each data gateway, a multi-access-enabled data gateway to serve the UE.

An embodiment of the present invention provides a UE, including: an information receiving unit, configured to receive multi-access indication information sent by a network device; an information checking unit, configured to judge, according to the multi-access indication information, whether the UE uses a multi-access function; and a multi-network access unit, configured to initiate an access connectivity establishment request from multi-networks when the multi-access function is used.

An embodiment of the present invention provides a UE, including: an indication information judging unit, configured to judge whether the UE receives non-authorization indication information or selection failure information sent by a network device, where the non-authorization indication information indicates that the UE is not authorized for multi-access, and the selection failure information indicates that the UE is not allowed to use the multi-access function; and a multi-network access unit, configured to initiate an access connectivity establishment request from multi-networks if no non-authorization indication information or no selection failure information is received.

It can be known from the preceding technical solutions that the embodiments of the present invention have the following advantages:

In embodiments of the present invention, the UE may obtain multi-access indication information from the network device, and according to the multi-access indication information, judge whether the UE can use the multi-access function; and if it is determined that the UE can use the multi-access function, the UE initiates an access connectivity establishment request from multi-networks. Therefore, after the UE uses the multi-access function to switch part of services on the PDN connection to a 3GPP network, the remaining services not switched to the 3GPP network can also keep in normal communication, and the normal communication can be continued without interruption.

In another embodiment of the present invention, after the network device receives a request from the UE, the network device selects a multi-access-enabled data gateway from the current data gateways to serve the UE. Therefore, the data gateway that serves the UE supports the multi-access function; after the UE uses the multi-access function to switch part of services on the PDN connection to a 3GPP network, the remaining services not switched to the 3GPP network can also keep in normal communication, and the normal communication can be continued without interruption.

BRIEF DESCRIPTION OF THE DRAWINGS

FIG. 4A and FIG. 4B are a schematic diagram of a multi-network access control method according to still another embodiment of the present invention;

DETAILED DESCRIPTION OF THE EMBODIMENTS

The embodiments of the present invention provide a multi-network access control method, a communication system, and relevant devices to prevent interruption of normal network communication when the multi-access function is used.

Figure 1:
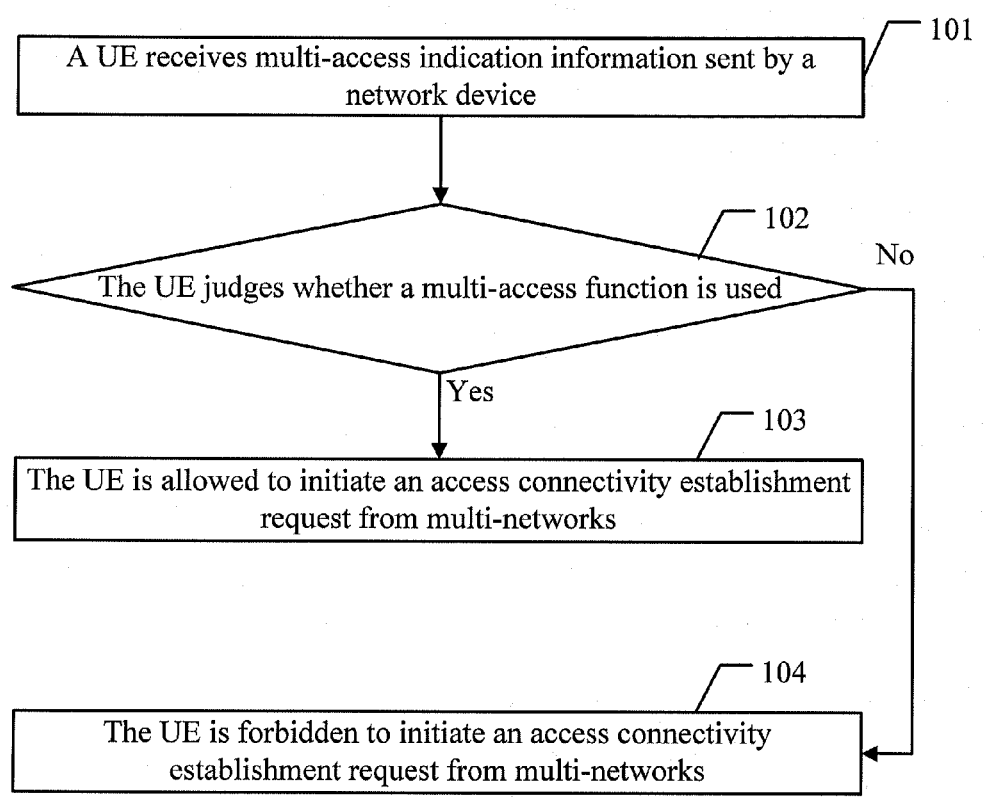
FIG. 1 is a schematic diagram of a multi-network access control method according to an embodiment of the present invention.

As shown in FIG. 1, an embodiment of the present invention provides a multi-network access control method, including the following steps:

101. A UE receives multi-access indication information sent by a network device.

In this embodiment, the UE may receive multi-access indication information from the network device. The multi-access indication information indicates whether the network device supports a multi-access function. Specifically, the multi-access indication information may be information about capability of the network device, or may be indication information directly indicating whether the network device supports the multi-access function.

It should be noted that in this embodiment, the UE may send a request message to the network device, requesting for obtaining the multi-access indication information; or, the UE may receive multi-access indication information which is actively sent by the network device. For example, the network device broadcasts the current multi-access indication information to the UE automatically at intervals; or, the network device broadcasts the current multi-access indication information to the UE when detecting change of the network device capability; or the network device broadcasts the current multi-access indication information to the UE when other preset conditions are fulfilled. The specific conditions are not limited herein.

102. According to the multi-access indication information, the UE judges whether the multi-access function is used; if the multi-access function is used, the procedure proceeds to step 103; if the multi-access function is not used, the procedure proceeds to step 104.

After the UE obtains the multi-access indication information from the network device, the UE may judge, according to the multi-access indication information, whether the current network device supports the multi-access function. It should be noted that the UE may further judge whether the UE itself supports the multi-access function; if both the network device and the UE support the multi-access function, the UE determines that the multi-access function can be used, and the procedure proceeds to step 103; if the network device or the UE does not support the multi-access function, the UE determines that the multi-access function cannot be used, and the procedure proceeds to step 104.

It is understandable that the UE may also only judge whether the network device supports the multi-access function. If the network device supports the multi-access function, the UE determines that the multi-access function can be used, and the procedure proceeds to step 103; if the network device does not support the multi-access function, the UE determines that the multi-access function cannot be used, and the procedure proceeds to step 104.

103. The UE is allowed to initiate an access connectivity establishment request from multi-networks.

If the UE determines that the multi-access function can be used, the UE is allowed to initiate an access connectivity establishment request from multi-networks. That is, when the user requests access from multi-networks, the UE sends an access connectivity establishment request to the corresponding target network; or, when the UE needs to perform access from multi-networks upon change of the network environment, the UE sends an access connectivity establishment request to the corresponding target network.

104. The UE is forbidden to initiate an access connectivity establishment request from multi-networks.

If the UE determines that the multi-access function cannot be used, the UE is forbidden to initiate an access connectivity establishment request from multi-networks. That is, when the user requests access from multi-networks or when the UE needs to perform access from multi-networks upon change of the network environment, the UE refuses to send an access connectivity establishment request to the corresponding target network.

In the embodiment of the present invention, the UE may obtain multi-access indication information from the network device, and according to the multi-access indication information, judge whether the UE can use the multi-access function; and if the UE determines that the UE can use the multi-access function, the UE initiates an access connectivity establishment request from multi-networks. Therefore, after the UE uses the multi-access function to switch part of services on the PDN connection to a 3GPP network, the remaining services not switched to the 3GPP network can also keep in normal communication, and the normal communication can be continued without interruption.

For ease of understanding, as an example, the following describes the process that the UE sends a request to the network device to obtain the multi-access indication information. The multi-access indication information may be obtained in the following different procedures:

I. Attach Procedure

In this embodiment, obtaining the multi-access indication information in an attach procedure may include the following steps:

(1) The UE sends an Attach Request to an access node.

When the UE enters an area covered by a network, the UE may first send an Attach Request to an access node in the network to get attached to the network.

In this embodiment, the Attach Request may carry information about multi-access capability of the UE. The information about multi-access capability of the UE indicates whether the UE supports the multi-access function. Alternatively, the Attach Request may carry an indication of requesting the multi-access indication information. The indication of requesting the multi-access indication information is used to request the access node to feed back the multi-access indication information. It is understandable that the Attach Request in this embodiment may carry no such parameters.

In this embodiment, the multi-access indication information may be information about capability of the network device, or indication information directly indicating whether the network device supports the multi-access function.

In this embodiment, the information about multi-access capability of the UE or the indication information may be carried in reserved bits of the Attach Request; or, a new field is added in the Attach Request to carry the information about multi-access capability of the UE or the indication of requesting multi-access indication information. The specific carrying modes are not limited herein.

(2) The access node obtains the multi-access indication information.

In this embodiment, after the access node receives the Attach Request sent by the UE, the access node may obtain the multi-access indication information from the data gateway in the process of establishing a PDN connection.

If the Attach Request carries information about multi-access capability of the UE or carries an indication of requesting the multi-access indication information, the access node may send a PDN Connectivity Establishment Request message that carries the information about multi-access capability of the UE or the indication of requesting the multi-access indication information to the data gateway in the process of establishing a PDN connection, so as to request the data gateway to feed back multi-access indication information. In this embodiment, the PDN Connectivity Establishment Request message may be a Create Default Bearer Request message.

If the Attach Request carries neither the information about multi-access capability of the UE nor the indication of requesting multi-access indication information, the access node may request, according to a policy preset by an operator, the data gateway to feed back multi-access indication information after receiving the Attach Request from the UE.

It should be noted that if the Attach Request carries information about multi-access capability of the UE, the access node or the data gateway may also check the information about multi-access capability of the UE, and judge whether the UE supports the multi-access function. If it is determined that the UE does not support the multi-access function, the access node or data gateway may not obtain the multi-access indication information; if it is determined that the UE supports the multi-access function, the access node or data gateway may obtain the multi-access indication information.

Specifically, the check may be performed by the access node or the data gateway:

When the access node performs the check, the access node judges, according to the information about multi-access capability of the UE, whether the UE supports the multi-access function; if the UE supports the multi-access function, the access node sends a PDN Connectivity Establishment Request message that carries the information about multi-access capability of the UE or the indication of requesting multi-access indication information, where the indication of requesting multi-access indication information is generated by the access node itself, to the data gateway in the process of establishing a PDN connection, so as to request the data gateway to feed back multi-access indication information.

When the data gateway performs the check, the access node sends a PDN Connectivity Establishment Request message that carries the information about multi-access capability of the UE to the data gateway in the process of establishing a PDN connection; and the data gateway judges, according to the information about the multi-access capability of the UE, whether the UE supports the multi-access function; if the UE supports the multi-access function, the data gateway sends a PDN Connectivity Establishment Accept message that carries multi-access indication information to the access node.

It is understandable that the process of checking the information about multi-access capability of the UE is not mandatory. In practice, the multi-access indication information may be obtained directly without checking the information about multi-access capability of the UE.

It should be noted that in this embodiment, the access node may obtain the subscription information of the UE from a database according to the Attach Request from the UE. If the subscription information includes no information about whether the UE is authorized for multi-access, or, if the subscription information indicates that the UE is authorized for multi-access, the access node may obtain multi-access indication information; if the subscription information indicates that the UE is not authorized for multi-access, the access node may not obtain the multi-access indication information, but feeds back non-authorization indication information to the UE. It is understandable that the process of checking the subscription information of the UE is not mandatory. In practice, the multi-access indication information may be obtained directly without checking the subscription information of the UE.

(3) The access node feeds back multi-access indication information to the UE.

After obtaining the multi-access indication information, the access node feeds back the multi-access indication information to the UE.

If the access node or data gateway determines, according to the information about multi-access capability of the UE, that the UE does not support the multi-access function, the access node may return information indicating "the UE does not support the multi-access function" to the UE.

(4) The UE receives the multi-access indication information sent by the access node.

After the access node feeds back the multi-access indication information to the UE, the UE may receive the multi-access indication information.

If the UE receives the information indicating "the UE does not support the multi-access function" from the access node, the UE may directly forbid initiating the access connectivity establishment request from multi-networks, and the procedure ends.

(5) The UE judges, according to the multi-access indication information, whether the UE can use the multi-access function; if the UE can use the multi-access function, the UE is allowed to initiate an access connectivity establishment request from multi-networks; if the UE cannot use the multi-access function, the UE is forbidden to initiate an access connectivity establishment request from multi-networks.

After the UE obtains the multi-access indication information from the network device, the UE may judge, according to the multi-access indication information, whether the current network device supports the multi-access function. It should be noted that the UE may further judge whether the UE itself supports the multi-access function; if both the network device and the UE support the multi-access function, it is determined that the multi-access function can be used; if the network device or the UE does not support the multi-access function, it is determined that the multi-access function cannot be used.

It is understandable that the UE may also only judge whether the network device supports the multi-access function. If the network device supports the multi-access function, it is determined that the multi-access function can be used; if the network device does not support the multi-access function, it is determined that the multi-access function cannot be used.

If the UE determines that the multi-access function can be used, the UE is allowed to initiate an access connectivity establishment request from multi-networks. That is, when the user requests to perform access from multi-networks, the UE sends an access connectivity establishment request to the corresponding target network; or, when the UE needs to perform access from multi-networks upon change of the network environment, the UE sends an access connectivity establishment request to the corresponding target network.

If the UE determines that the multi-access function cannot be used, the UE is forbidden to initiate an access connectivity establishment request from multi-networks. That is, when the user requests to perform access from multi-networks or when the UE needs to perform access from multi-networks upon change of the network environment, the UE refuses to send an access connectivity establishment request to the corresponding target network.

Figure 2A:
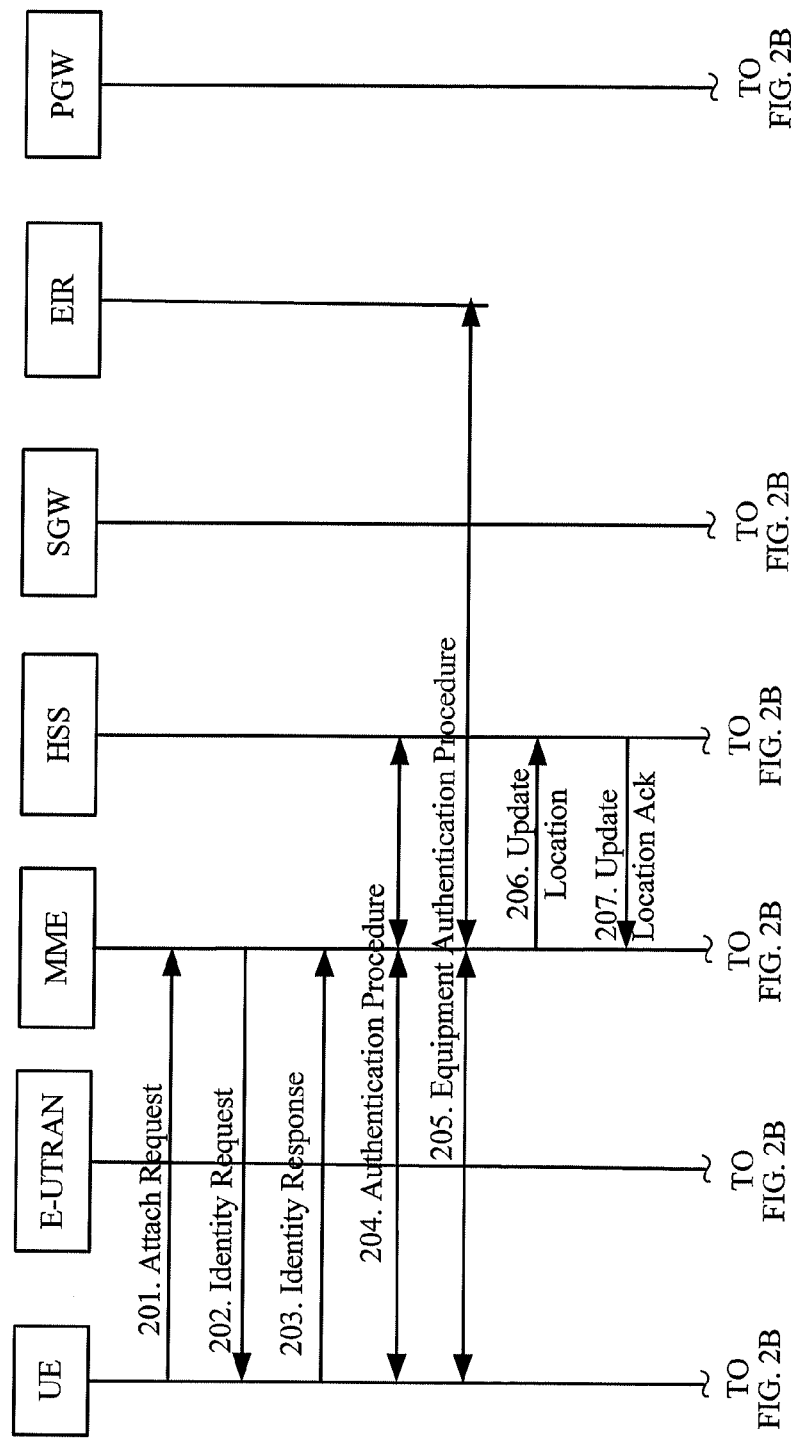
FIG. 2A and FIG. 2B are a schematic diagram of a multi-network access control method according to another embodiment of the present invention.
Figure 2B:
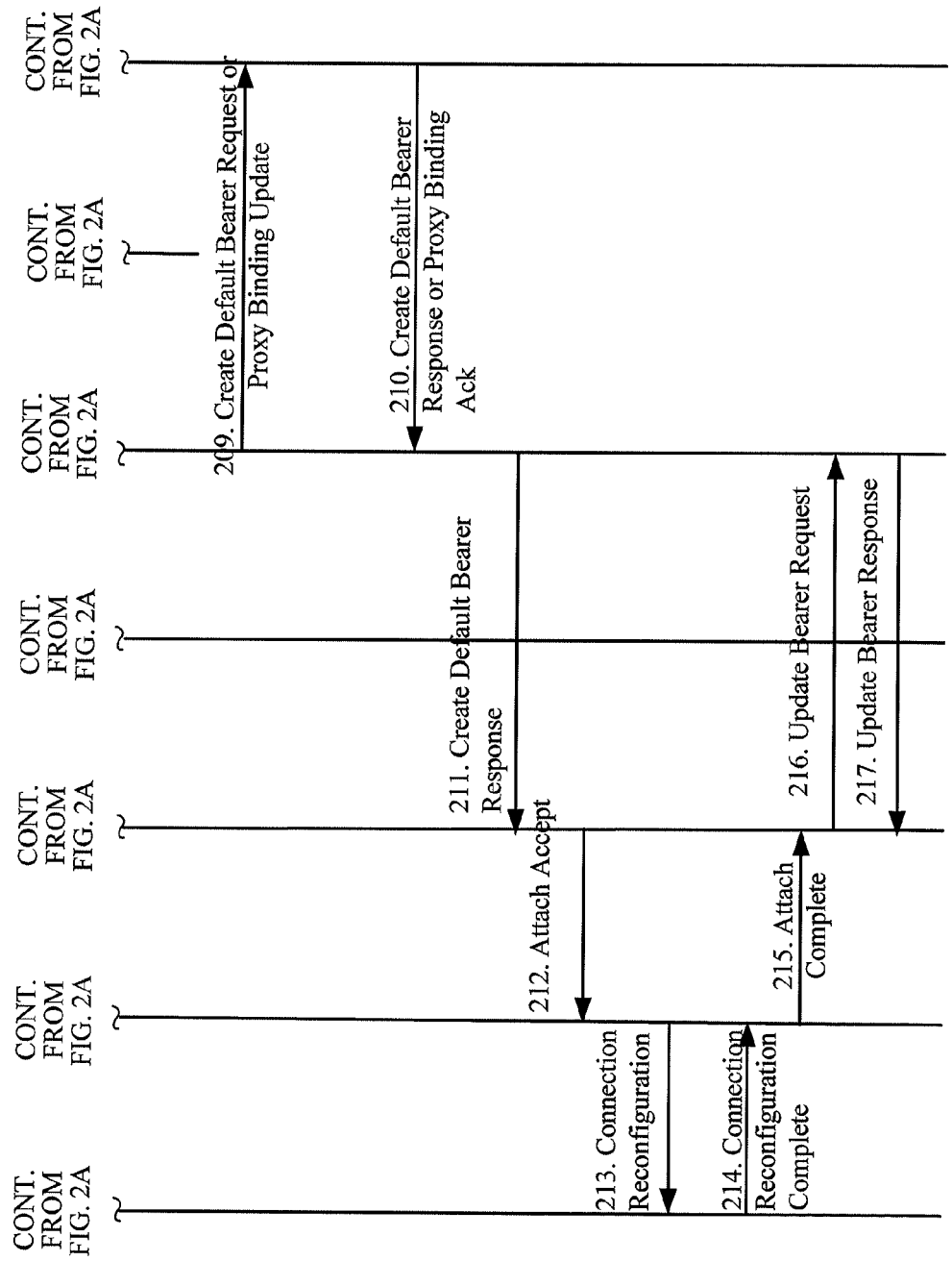

The process that the UE obtains the information about multi-access capability of the data gateway from the access node in the attach procedure is described above. In specific networks, the network elements that act as the access node and the data gateway may be different. In a 3GPP network, the access node may be a Mobility Management Entity (MME) and a Serving Gateway (SGW), and the data gateway may be a PGW. The following takes a 3GPP network as an example for detailed description. As shown in FIG. 2A and FIG. 2B, another embodiment of the present invention provides a multi-network access control method, including the following steps:

201. A UE sends an Attach Request to an MME.

When the UE enters an area covered by a network, the UE first sends an Attach Request to the MME in the network to get attached to the network.

In this embodiment, the Attach Request may carry information about multi-access capability of the UE or carry an indication of requesting multi-access indication information. A new field may be added in the Attach Request to carry the information about multi-access capability of the UE or the indication of requesting multi-access indication information, or carry other form of indication information which is used to request the MME to feed back multi-access indication information.

202. The MME sends an Identity Request to the UE.

After receiving the Attach Request sent by the UE, the MME may send an Identity Request to the UE so as to authenticate the identity of the UE.

203. The UE sends an Identity Response to the MME.

204. Mutual authentication is performed between the MME and the UE.

The MME may perform mutual authentication with the UE through user information stored in a Home Subscriber Server (HSS).

205. The MME checks the International Mobile Station Equipment Identity (IMEI) of the UE through an Equipment Identity Register (EIR).

Steps 202-205 are an authentication process, which includes identity authentication and equipment authentication.

It should be noted that in practice, if the security and reliability of the UE and the MME can be ensured, or the attach procedure is not much sensitive to security, steps 202-205 may not be executed.

206. The MME updates location information of the UE in the HSS.

207. The MME receives an Update Location Acknowledgement (Ack) message from the HSS, and obtains the subscription information of the UE at the same time.

208. The MME sends a Create Default Bearer Request message to an SGW.

If the UE subscription information obtained by the MME in step 207 includes no information indicating whether the UE is authorized for multi-access, or, if the subscription information indicates that the UE is authorized for multi-access, the Create Default Bearer Request message sent by the MME to the SGW may carry the information about multi-access capability of the UE or the indication of requesting multi-access indication information obtained in step 201. It should be noted that if the Attach Request in step 201 carries neither the information about multi-access capability of the UE nor the indication of requesting multi-access indication information, the MME may send a Create Default Bearer Request message to the SGW according to a policy preset by the operator. The Create Default Bearer Request message carries an indication of requesting multi-access indication information, and the indication of requesting the multi-access indication information is used to request the PGW to feed back multi-access indication information.

If the UE subscription information obtained by the MME in step 207 indicates that the UE is not authorized for multi-access, the Create Default Bearer Request message sent by the MME to the SGW may carry no indication information, and the default bearer is created according to an ordinary procedure.

In this embodiment, if the MME obtains an indication of requesting multi-access indication information in step 201, the MME may directly send a Create Default Bearer Request message that carries the indication of requesting multi-access indication information to the SGW; if the MME obtains information about multi-access capability of the UE in step 201, the MME may also judge, according to the information about multi-access capability of the UE, whether the UE supports the multi-access function, and does not send a Create Default Bearer Request message that carries the information about multi-access capability of the UE to the SGW unless the UE supports the multi-access function.

In practice, the check on the subscription information of the UE may be combined with the check on the information about multi-access capability of the UE. For example, the MME does not send the information about multi-access capability of the UE to the SGW unless the subscription information indicates that the UE is authorized for multi-access and the UE supports the multi-access function.

It should be noted that the check on the subscription information of the UE and the check on the information about multi-access capability of the UE are not mandatory. In practice, the MME may perform no check, but directly send a Create Default Bearer Request message to the SGW, where the message carries the information about multi-access capability of the UE or an indication of requesting multi-access indication information.

209. When the SGW exchanges signaling with the PGW through a General Packet Radio Service (GPRS) Tunneling Protocol (GTP), the SGW sends a Create Default Bearer Request message to the PGW; when the SGW exchanges signaling with the PGW through a Proxy Mobile Internet Protocol (PMIP), the SGW sends a Proxy Binding Update message to the PGW.

Through the Create Default Bearer Request message or the Proxy Binding Update message, the SGW forwards to the PGW the received information about multi-access capability of the UE or the received indication of requesting multi-access indication information.

In this embodiment, if the SGW receives an indication of requesting multi-access indication information, the SGW may directly forwards to the PGW the indication of requesting multi-access indication information through a Create Default Bearer Request message or a Proxy Binding Update message.

In this embodiment, if the SGW receives the information about multi-access capability of the UE, the SGW may also check whether the UE supports the multi-access function. And when the UE supports the multi-access function, the SGW may send a Create Default Bearer Request message or a Proxy Binding Update message to the PGW, where the Create Default Bearer Request message or Proxy Binding Update message carries the information about multi-access capability of the UE.

It should be noted that the check on the information about multi-access capability of the UE is not mandatory. In practice, the SGW may perform no check, but directly send a Create Default Bearer Request message or a Proxy Binding Update message to the PGW, where the Create Default Bearer Request message or Proxy Binding Update message carries the information about multi-access capability of the UE.

210. When the SGW exchanges signaling with the PGW through a GTP protocol, the PGW sends a Create Default Bearer Response message to the SGW; when the SGW exchanges signaling with the PGW through a PMIP protocol, the PGW sends a Proxy Binding Ack message to the SGW.

If the PGW receives the information about multi-access capability of the UE from the SGW, the PGW may check, according to the received information about multi-access capability of the UE, whether the UE supports the multi-access function; if it is determined that the UE supports the multi-access function, the PGW sends a Create Default Bearer Response message or a Proxy Binding Ack message to the SGW, where the Create Default Bearer Response message or Proxy Binding Ack message carries information about multi-access capability of the PGW, and sends multi-access indication information according to information about multi-access capability of the PGW. The multi-access indication information may carry information about multi-access capability of the PGW. If it is determined that the UE does not support the multi-access function, a Create Default Bearer Response message or a Proxy Binding Ack message sent by the PGW may carry no information about multi-access capability of the PGW.

If the PGW receives from the SGW an indication of requesting multi-access indication information, the PGW may directly send a Create Default Bearer Response message or a Proxy Binding Ack message to the SGW, where the Create Default Bearer Response message or Proxy Binding Ack message carries information about multi-access capability of the PGW, and the PGW may send multi-access indication information according to information about multi-access capability of the PGW.

It should be noted that the check on the information about multi-access capability of the UE is not mandatory. In practice, the PGW may perform no check, but directly send a Create Default Bearer Response message or a Proxy Binding Ack message to the SGW, where the Create Default Bearer Response message or Proxy Binding Ack message carries information about multi-access capability of the PGW.

In this embodiment, the PGW may send a Create Default Bearer Response message or a Proxy Binding Ack message to the SGW, where the Create Default Bearer Response message or Proxy Binding Ack message carries information about multi-access capability of the PGW. Also, the PGW may first judge whether the PGW itself supports the multi-access function. If the PGW supports the multi-access function, the Create Default Bearer Response message or the Proxy Binding Ack message carries information indicating that the PGW supports the multi-access function, and the PGW sends multi-access indication information according to the indication information. If the PGW does not support the multi-access function, the Create Default Bearer Response message or the Proxy Binding Ack message carries information indicating that the PGW does not support the multi-access function, and the PGW sends multi-access indication information according to the indication information.

211. The SGW sends a Create Default Bearer Response message to the MME.

If the SGW receives multi-access indication information (information about multi-access capability of the PGW, or information indicating that the PGW supports the multi-access function, or information indicating that the PGW does not support the multi-access function) from the PGW, the SGW may forward the multi-access indication information to the MME through a Create Default Bearer Response message.

212. The MME sends an Attach Accept message to an Evolved Universal mobile telecommunications system Terrestrial Radio Access Network (E-UTRAN).

If the MME receives multi-access indication information from the SGW, the MME may send to the E-UTRAN an Attach Accept message that carries the multi-access indication information.

It should be noted that if the MME checks the subscription information and the UE is not authorized for multi-access, the Attach Accept message sent by the MME to the E-UTRAN in this step may carry non-authorization indication information, and the MME sends multi-access indication information according to the non-authorization indication information, where the multi-access indication information indicates that the UE is not authorized for multi-access.

If the multi-access indication information includes information about multi-access capability of the PGW, the MME may determine, according to the received information about multi-access capability of the PGW, whether the PGW supports the multi-access function first; if it is determined that the PGW supports the multi-access function, the MME sends information indicating that the PGW supports the multi-access function; if it is determined that the PGW does not support the multi-access function, the MME sends to the E-UTRAN information indicating that the PGW does not support the multi-access function. The MME sends multi-access indication information according to the information indicating that the PGW supports the multi-access function or according to the information indicating that the PGW does not support the multi-access function.

It is understandable that if the multi-access indication information includes information about multi-access capability of the PGW, the MME may directly send the multi-access indication information to the E-UTRAN.

If the multi-access indication information includes the information indicating that the PGW supports the multi-access function or the information indicating that the PGW does not support the multi-access function, the MME may directly send the multi-access indication information to the E-UTRAN.

213. The E-UTRAN sends a Radio Resource Control (RRC) Connection Reconfiguration message to the UE.

If the E-UTRAN receives multi-access indication information (information about multi-access capability of the PGW, or information indicating that the PGW supports the multi-access function, or information indicating that the PGW does not support the multi-access function, or non-authorization indication information) from the MME, the E-UTRAN sends to the UE an RRC Connection Reconfiguration message that carries the multi-access indication information.

214. The UE sends an RRC Connection Reconfiguration Complete message to the E-UTRAN.

215. The E-UTRAN sends an Attach Complete message to the MME.

216. The MME sends an Update Bearer Request message to the SGW.

217. The SGW sends an Update Bearer Response message to the MME.

In this embodiment, after receiving multi-access indication information, the UE may determine, according to the multi-access indication information, whether the UE can use the multi-access function. If the UE can use the multi-access function, the UE is allowed to initiate an access connectivity establishment request from multi-networks; if the UE cannot use the multi-access function, the UE is forbidden to initiate an access connectivity establishment request from multi-networks.

The specific determining mode may be as follows:

If the multi-access indication information includes information about multi-access capability of the PGW, where the information about multi-access capability of the PGW indicates that the PGW supports the multi-access function, and the UE itself supports the multi-access function, the UE determines that the multi-access function can be used. If information about multi-access capability of the PGW indicates that the PGW does not support the multi-access function, or the UE itself does not support the multi-access function, the UE determines that the multi-access function cannot be used.

If the multi-access indication information includes information indicating that the PGW supports the multi-access function, and the UE itself also supports the multi-access function, the UE determines that the multi-access function can be used. If the multi-access indication information includes information indicating that the PGW does not support the multi-access function, or the UE itself does not support the multi-access function, the UE determines that the multi-access function cannot be used.

If the multi-access indication information includes non-authorization indication information, the UE determines that the multi-access function cannot be used no matter whether the UE itself supports the multi-access function.

The MME in this embodiment may be regarded as an access node. The access node may vary depending on the type of the application network. In the 3GPP network in this embodiment, the access node is an MME, but in practice, it is understandable that the access node may be other network element such as a Serving GPRS Support Node (SGSN). The data gateway in this embodiment is a PGW, but in practice, the data gateway may be a Gateway GPRS Support Node (GGSN), a mobility anchor, or other network element.

In this embodiment, the UE may request the MME to feed back multi-access indication information by sending an Attach Request to the MME. After receiving the Attach Request, the MME may obtain information about multi-access capability of the PGW from the PGW through the SGW in the process of creating a default bearer, and send multi-access indication information according to information about multi-access capability of the PGW; or, the MME directly obtains information indicating whether the PGW supports the multi-access function, and sends multi-access indication information according to the indication information. In this way, the multi-access indication information can be fed back to the UE. According to the obtained multi-access indication information, the UE judges whether the UE can use the multi-access function. The UE does not initiate an access connectivity establishment request from multi-networks unless it is determined that the UE can use the multi-access function. Therefore, after the UE uses the multi-access function to switch part of services on the PDN connection to a 3GPP network, the remaining services not switched to the 3GPP network can also keep in normal communication, and the normal communication can be continued without interruption.

In this embodiment, the MME may check the subscription information of the UE. When the subscription information indicates that the UE is not authorized for multi-access, the multi-access indication information may only include non-authorization indication information without including information about multi-access capability of the PGW. In this way, the data transmitted between the network elements is reduced, and the network load is reduced.

Figure 3A:
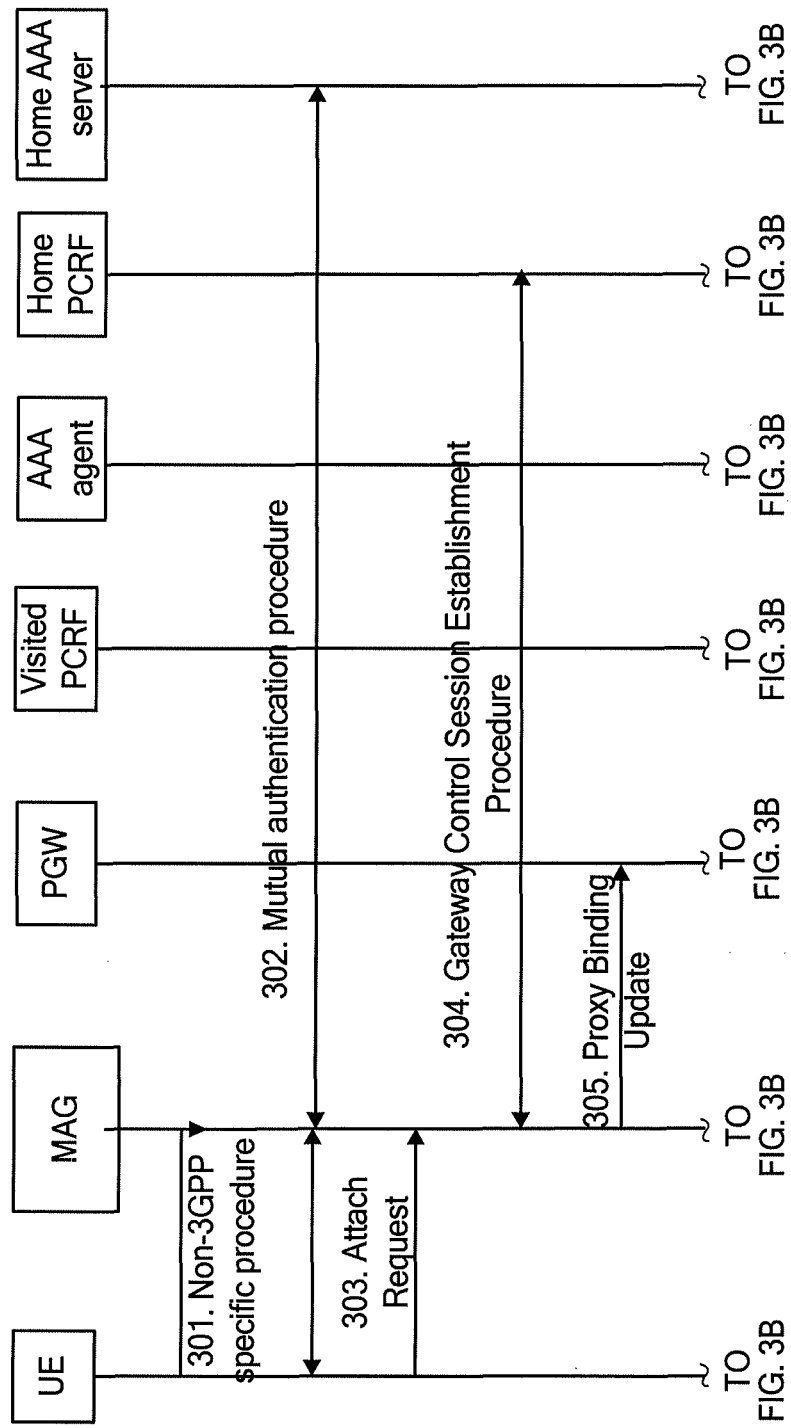
FIG. 3A and FIG. 3B are a schematic diagram of a multi-network access control method according to still another embodiment of the present invention.
Figure 3B:
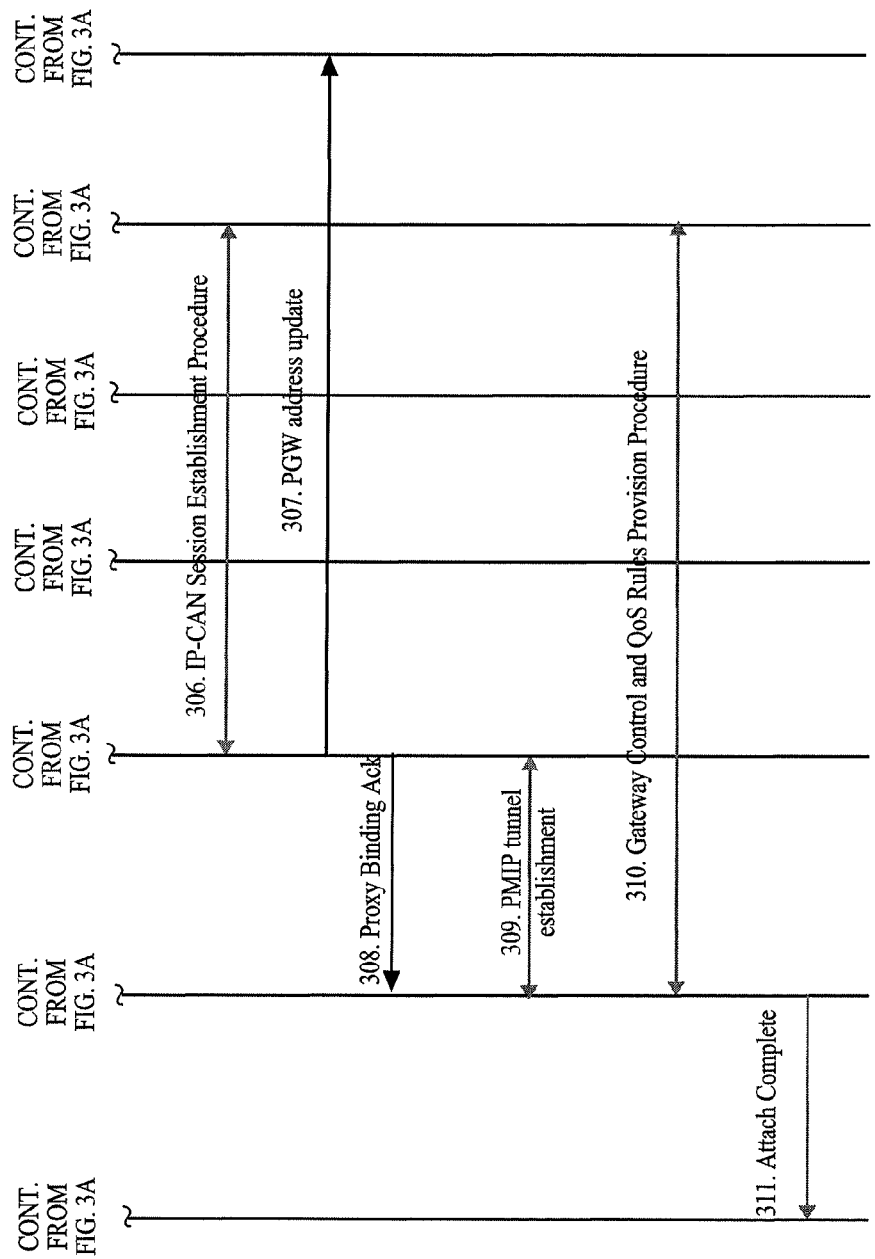

In the foregoing embodiment, the attach procedure in a 3GPP network is taken as an example for description. In practice, it is understandable that the UE may also obtain the information about multi-access capability of the data gateway through an attach procedure in a non-3GPP network. In a non-3GPP network, the access node may be a Mobility Access Gateway (MAG), and the data gateway may be a PGW. As shown in FIG. 3A and FIG. 3B, another embodiment of the present invention provides a multi-network access control method, including the following steps:

301. A UE and a MAG perform a non-3GPP specific procedure.

In this embodiment, the MAG is an access node, and specifically, may be an IP access gateway of a non-3GPP network or an Evolved Packet Data Gateway (EPDG).

302. Authentication is performed between the UE and the MAG through an HSS or an Authentication Authorization Accounting (AAA) server.

In this embodiment, the MAG may obtain the subscription information of the UE through the HSS or AAA server.

303. The UE initiates an L3 Attach Trigger procedure to the MAG, and sends an Attach Request to the MAG.

The Attach Request in this embodiment may carry information about multi-access capability of the UE or carry an indication of requesting multi-access indication information. A new field may be added in the Attach Request to carry the information about multi-access capability of the UE or the indication of requesting multi-access indication information, or carry other form of indication information which is used to request the MAG to feed back multi-access indication information.

If the UE subscription information obtained by the MAG includes no information indicating whether the UE is authorized for multi-access, or, if the subscription information indicates that the UE is authorized for multi-access, the message sent by the MAG to the PGW may carry the information about multi-access capability of the UE or the indication of requesting multi-access indication information obtained by the MAG. It should be noted that if the Attach Request in step 301 carries neither information about multi-access capability of the UE nor the indication of requesting multi-access indication information, the MAG may send a message to the PGW according to a policy preset by the operator, where the message carries an indication of requesting multi-access indication information, and the indication of requesting multi-access indication information is used to request the PGW to feed back multi-access indication information.

If the UE subscription information obtained by the MAG indicates that the UE is not authorized for multi-access, the message sent by the MAG to the PGW may carry no indication information, and the MAG proceeds according to an ordinary procedure.

In this embodiment, if the MAG obtains an indication of requesting multi-access indication information in step 301, the MAG may directly send to the PGW a message that carries the indication of requesting multi-access indication information; if the MAG obtains information about multi-access capability of the UE in step 301, the MAG may also judge, according to the information about multi-access capability of the UE, whether the UE supports the multi-access function, and does not send the message that carries the information about multi-access capability of the UE to the PGW unless the UE supports the multi-access function.

In practice, the check on the subscription information of the UE may be combined with the check on the information about multi-access capability of the UE. For example, the MAG does not send the information about multi-access capability of the UE to the PGW unless the subscription information indicates that the UE is authorized for multi-access and the UE supports the multi-access function.

It should be noted that the check on the subscription information of the UE and the check on the information about multi-access capability of the UE are not mandatory. In practice, the MAG may perform no check, but directly send to the PGW the information about multi-access capability of the UE or the indication of requesting multi-access indication information.

304. A Gateway Control Session Establishment Procedure is initiated.

305. The MAG sends a Proxy Binding Update message to the PGW.

The Proxy Binding Update message may carry the information about multi-access capability of the UE or the indication of requesting multi-access indication information mentioned in step 303.

306. The PGW initiates an Internet Protocol Connectivity Access Network (IP-CAN) Session Establishment Procedure between the PGW and a home Policy Control and Charging Rules Function (PCRF).

307. The PGW updates the user's PGW identifier of the PDN connection and Access Point Name (APN) on the HSS/AAA server.

308. The PGW sends a Proxy Binding Ack message to the MAG.

When the PGW receives the information about multi-access capability of the UE from the MAG, the PGW may check the information about multi-access capability of the UE. If it is determined that the UE supports the multi-access function, the PGW may send multi-access indication information to the MAG.

If the UE does not support the multi-access function, the PGW may not send multi-access indication information to the MAG.

If the PGW receives from the MAG an indication of requesting multi-access indication information, the PGW may directly send multi-access indication information to the MAG.

It is understandable that if the Proxy Binding Update message sent by the MAG includes neither the information about multi-access capability of the UE nor the indication of requesting multi-access indication information, the PGW may still directly feed back multi-access indication information to the MAG according to the policy preset by the operator.

The multi-access indication information in this step may include information about multi-access capability of the PGW. It should be noted that after receiving the message sent by the MAG the PGW may first judge whether the PGW itself supports the multi-access function. If the PGW supports the multi-access function, the PGW feeds back information indicating that the PGW supports the multi-access function to the MAG; if the PGW does not support the multi-access function, the PGW may send information indicating that the PGW does not support the multi-access function to the MAG. Multi-access indication information may be sent according to the information indicating that the PGW supports the multi-access function or according to the information indicating that the PGW does not support the multi-access function.

309. A PMIP tunnel is established between the PGW and the MAG.

310. The home PCRF may initiate a Gateway Control and QoS Rules Provision Procedure to update Quality of Service (QoS) information in the MAG.

311. The attach procedure is complete.

After the MAG receives the multi-access indication information from the PGW, if the multi-access indication information includes information about multi-access capability of the PGW, the MAG may first judge whether the PGW supports the multi-access function. If the PGW supports the multi-access function, the MAG sends information indicating that the PGW supports the multi-access function to the UE through an Attach Complete procedure; if the PGW does not support the multi-access function, the MAG sends information indicating that the PGW does not support the multi-access function to the UE through an Attach Complete procedure. The MAG sends multi-access indication information according to the information indicating that the PGW supports the multi-access function or according to the information indicating that the PGW does not support the multi-access function.

It is understandable that in this embodiment, the MAG may directly send to the UE multi-access indication information that includes information about multi-access capability of the PGW.

It should be noted that if the multi-access indication information received by the MAG from the PGW already includes the information indicating that the PGW supports the multi-access function or the information indicating that the PGW does not support the multi-access function, the MAG may directly send the multi-access indication information to the UE.

In this embodiment, if the UE subscription information obtained by the MAG in step 303 indicates that the UE is not authorized for multi-access, the MAG may send a non-authorization indication to the UE in this step, and may send multi-access indication information according to the non-authorization indication.

In this embodiment, after receiving multi-access indication information, the UE may determine, according to the multi-access indication information, whether the UE can use the multi-access function. If the UE can use the multi-access function, the UE is allowed to initiate an access connectivity establishment request from multi-networks; if the UE cannot use the multi-access function, the UE is forbidden to initiate an access connectivity establishment request from multi-networks.

The detailed determining mode may be as follows:

If the multi-access indication information includes information about multi-access capability of the PGW, where the information about multi-access capability of the PGW indicates that the PGW supports the multi-access function, and the UE itself also supports the multi-access function, the UE determines that the multi-access function can be used. If information about multi-access capability of the PGW indicates that the PGW does not support the multi-access function, or the UE itself does not support the multi-access function, the UE determines that the multi-access function cannot be used.

If the multi-access indication information includes information indicating that the PGW supports the multi-access function, and the UE itself supports the multi-access function, the UE determines that the multi-access function can be used. If the multi-access indication information includes information indicating that the PGW does not support the multi-access function, or the UE itself does not support the multi-access function, the UE determines that the multi-access function cannot be used.

If the multi-access indication information includes non-authorization indication information, the UE determines that the multi-access function cannot be used no matter whether the UE itself supports the multi-access function.

How the UE obtains multi-access indication information in an attach procedure is described above, and the following describes how the UE obtains multi-access indication information in another procedure.

II. PDN Connectivity Request Procedure

In this embodiment, the obtaining of the multi-access indication information in a PDN connectivity request procedure includes the following steps:

(1) A UE sends a PDN Connectivity Establishment Request to an access node.

When the UE requests establishing a PDN connection, the UE may send a PDN Connectivity Establishment Request to the access node.

In this embodiment, the PDN Connectivity Establishment Request may carry information about multi-access capability of the UE. The information about multi-access capability of the UE indicates whether the UE supports the multi-access function. Alternatively, the PDN Connectivity Establishment Request may carry an indication of requesting the multi-access indication information which is used to request the access node to feed back multi-access indication information. It is understandable that the PDN Connectivity Establishment Request in this embodiment may carry no such parameters.

In this embodiment, the information about multi-access capability of the UE or the indication information may be carried in reserved bits of the PDN Connectivity Establishment Request; or, a new field is added in the PDN Connectivity Establishment Request to carry the information about multi-access capability of the UE or the indication information. The specific carrying mode is not limited herein.

(2) The access node obtains multi-access indication information.

In this embodiment, after receiving the PDN Connectivity Establishment Request sent by the UE, the access node may obtain the multi-access indication information from the data gateway in the process of establishing a PDN connection.

If the PDN Connectivity Establishment Request carries information about multi-access capability of the UE or an indication of requesting multi-access indication information, the access node may send a PDN Connectivity Establishment Request message that carries the information about multi-access capability of the UE or an indication of requesting multi-access indication information to the data gateway in the process of establishing a PDN connection, so as to request the data gateway to feed back multi-access indication information. In this embodiment, the PDN Connectivity Establishment Request message may be a Proxy Binding Update Request message.

If the PDN Connectivity Establishment Request carries neither the information about multi-access capability of the UE nor the indication of requesting multi-access indication information, the access node may request, according to a policy preset by the operator, the data gateway to feed back multi-access indication information after receiving the PDN Connectivity Establishment Request from the UE.

It should be noted that if the PDN Connectivity Establishment Request carries information about multi-access capability of the UE, the access node or the data gateway may check the information about multi-access capability of the UE, and judge whether the UE supports the multi-access function. If it is determined that the UE does not support the multi-access function, the multi-access indication information may not be obtained; if it is determined t that the UE supports the multi-access function, the multi-access indication information may be obtained.

Specifically, the check may be performed by the access node or the data gateway:

When the access node performs the check, the access node judges, according to the information about multi-access capability of the UE, whether the UE supports the multi-access function; if the UE supports the multi-access function, the access node sends a PDN Connectivity Establishment Request message that carries the information about multi-access capability of the UE or the indication of requesting multi-access indication information, where the indication of requesting multi-access indication information is generated by the access node, to the data gateway in the process of establishing a PDN connection, so as to request the data gateway to feed back multi-access indication information. The PDN Connectivity Establishment Request message in this embodiment may be a Proxy Binding Update Request message.

When the data gateway performs the check, the access node sends a PDN Connectivity Establishment Request message that carries the information about multi-access capability of the UE to the data gateway in the process of establishing a PDN connection; and the data gateway judges, according to the information about multi-access capability of the UE, whether the UE supports the multi-access function; if the UE supports the multi-access function, the data gateway sends multi-access indication information according to the information about multi-access capability of the data gateway, and sends a PDN Connectivity Establishment Accept message that carries multi-access indication information to the access node.

It should be noted that in this embodiment, when the data gateway determines that the UE supports the multi-access function, the data gateway may judge whether the data gateway itself supports the multi-access function. If the data gateway supports the multi-access function, the PDN Connectivity Establishment Accept message sent by the data gateway to the access node carries information indicating that the data gateway supports the multi-access function; if the data gateway itself does not support the multi-access function, the PDN Connectivity Establishment Accept message sent by the data gateway to the access node carries information indicating that the data gateway does not support the multi-access function. The data gateway sends multi-access indication information according to the information indicating that the data gateway supports the multi-access function or according to the information indicating that the data gateway does not support the multi-access function. In this embodiment, the PDN Connectivity Establishment Accept message may be a Proxy Binding Update Ack message.

It is understandable that the process of checking the information about multi-access capability of the UE is not mandatory. In practice, the multi-access indication information may be obtained without checking the information about multi-access capability of the UE.

It should be noted that in this embodiment, the access node may check the subscription information according to the subscription information obtained by the UE when the UE attaches itself to the network. If the subscription information includes no information indicating whether the UE is authorized for multi-access, or, if the subscription information indicates that the UE is authorized for multi-access, the access node may obtain multi-access indication information; if the subscription information indicates that the UE is not authorized for multi-access, the access node may not obtain the multi-access indication information, but feeds back non-authorization indication information to the UE, and sends multi-access indication information according to the non-authorization indication information. It is understandable that the process of checking the subscription information of the UE is not mandatory. In practice, the multi-access indication information may be obtained without checking the subscription information of the UE.

(3) The access node feeds back multi-access indication information to the UE.

After obtaining the multi-access indication information, the access node feeds back the multi-access indication information to the UE.

(4) The UE receives the multi-access indication information sent by the access node.

After the access node feeds back the multi-access indication information to the UE, the UE may receive the multi-access indication information.

(5) The UE judges, according to the multi-access indication information, whether the UE can use the multi-access function; if the UE can use the multi-access function, the UE is allowed to initiate an access connectivity establishment request from multi-networks; if the UE cannot use the multi-access function, the UE is forbidden to initiate an access connectivity establishment request from multi-networks.

After the UE obtains the multi-access indication information from the network device, the UE judges, according to the multi-access indication information, whether the current network device supports the multi-access function. It should be noted that the UE may further judge whether the UE itself supports the multi-access function; if both the network device and the UE support the multi-access function, it is determined that the multi-access function can be used; if the network device or the UE does not support the multi-access function, it is determined that the multi-access function cannot be used.

It is understandable that the UE may only judge whether the network device supports the multi-access function. If the network device supports the multi-access function, it is determined that the multi-access function can be used; if the network device does not support the multi-access function, it is determined that the multi-access function cannot be used.

If the UE determines that the multi-access function can be used, the UE is allowed to initiate an access connectivity establishment request from multi-networks. That is, when the user requests to perform access from multi-networks, the UE sends an access connectivity establishment request to the corresponding target network; or, when the UE needs to perform access from multi-networks upon change of the network environment, the UE sends an access connectivity establishment request to the corresponding target network.

If the UE determines that the multi-access function cannot be used, the UE is forbidden to initiate an access connectivity establishment request from multi-networks. That is, when the user requests to perform access from multi-networks or when the UE needs to perform access from multi-networks upon change of the network environment, the UE refuses to send an access connectivity establishment request to the corresponding target network.

Figure 4A:
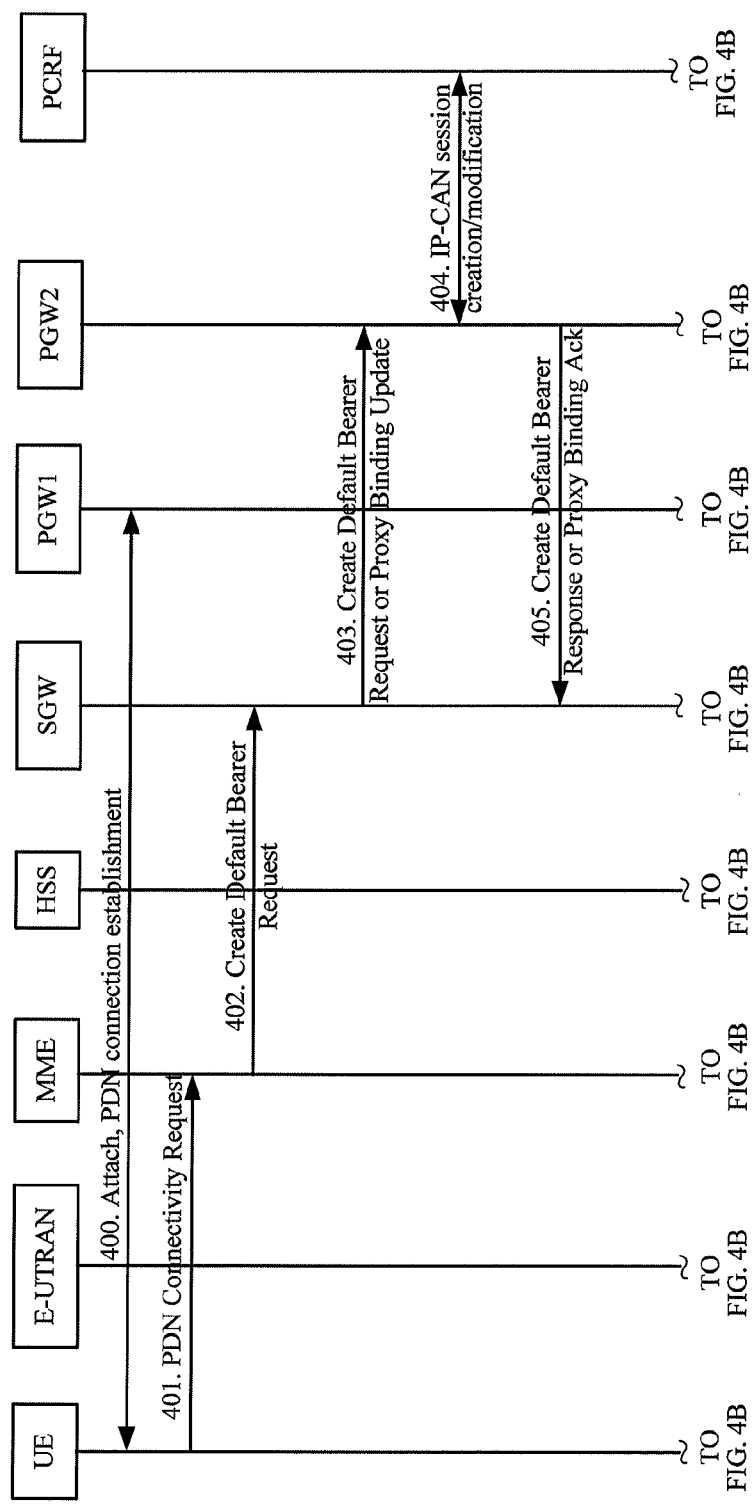

How the UE obtains multi-access indication information from an access node in a PDN connectivity establishment request procedure is described above. In specific networks, the network elements that act as the access node and the data gateway may be different. In a 3GPP network, the access node may be an MME and the data gateway may be a PGW. In the following detailed description, a 3GPP network is taken as an example. As shown in FIG. 4A and FIG. 4B, another embodiment of the present invention provides a multi-network access control method, including the following steps:

400. After getting attached to the 3GPP network, the UE establishes a PDN connection with PGW 1.

401. The UE sends a PDN Connectivity Request message to the MME.

In this embodiment, the PDN Connectivity Request message may carry information about multi-access capability of the UE or an indication of requesting multi-access indication information.

402. The MME sends a Create Default Bearer Request message to the SGW.

In this embodiment, the operations performed by the MME in step 402 are the same as the operations performed in step 208 in the embodiment shown in FIG. 2A and FIG. 2B.

403. If the SGW exchanges signaling with PGW 2 through a GTP protocol, the SGW sends a Create Default Bearer Request message to PGW 2; if the SGW exchanges signaling with PGW 2 through a PMIP protocol, the SGW sends a Proxy Binding Update message to PGW 2.

In this embodiment, PGW 2 is a new PGW selected by the UE to request establishing a PDN connection.

Through the Create Default Bearer Request message or the Proxy Binding Update message, the SGW forwards the information about multi-access capability of the UE or the indication of requesting multi-access indication information to PGW 2.

In this embodiment, if the SGW receives an indication of requesting multi-access indication information, the SGW may directly forward the indication of requesting multi-access indication information to PGW 2 through a Create Default Bearer Request message or a Proxy Binding Update message.

In this embodiment, if the SGW receives the information about multi-access capability of the UE, the SGW may also check whether the UE supports the multi-access function. When the UE supports the multi-access function, the SGW sends a Create Default Bearer Request message or a Proxy Binding Update message to PGW 2, where the Create Default Bearer Request message or Proxy Binding Update message carries the information about multi-access capability of the UE.

It should be noted that the check on the information about multi-access capability of the UE is not mandatory. In practice, the SGW may perform no check, but directly send a Create Default Bearer Request message or a Proxy Binding Update message to PGW 2, where the Create Default Bearer Request message or Proxy Binding Update message carries the information about multi-access capability of the UE.

404. An IP-CAN session is created or modified.

405. If the SGW exchanges signaling with PGW 2 through a GTP protocol, PGW 2 sends a Create Default Bearer Response message to the SGW; if the SGW exchanges signaling with PGW 2 through a PMIP protocol, PGW 2 sends a Proxy Binding Ack message to the SGW.

If PGW 2 receives the information about multi-access capability of the UE from the SGW, PGW 2 may check, according to the information about the multi-access capability of the UE, whether the UE supports the multi-access function; if it is determined that the UE supports the multi-access function, PGW 2 sends a Create Default Bearer Response message or a Proxy Binding Ack message, where the Create Default Bearer Response message or Proxy Binding Ack message carries information about multi-access capability of the PGW, to the SGW, and sends multi-access indication information according to information about multi-access capability of the PGW. If it is determined that the UE does not support the multi-access function, PGW 2 sends a Create Default Bearer Response message or a Proxy Binding Ack message, where the Create Default Bearer Response message or Proxy Binding Ack message may not carry information about multi-access capability of PGW 2.

If PGW 2 receives from the SGW an indication of requesting multi-access indication information, PGW 2 may directly send a Create Default Bearer Response message or a Proxy Binding Ack message, where the Create Default Bearer Response message or Proxy Binding Ack message carries information about multi-access capability of PGW 2, to the SGW, and send multi-access indication information according to information about multi-access capability of the PGW.

It should be noted that the check on the information about multi-access capability of the UE is not mandatory. In practice, PGW 2 may perform no check, but directly send a Create Default Bearer Response message or a Proxy Binding Ack message to the SGW, where the Create Default Bearer Response message or Proxy Binding Ack message carries information about multi-access capability of PGW 2.

In this embodiment, PGW 2 may send a Create Default Bearer Response message or a Proxy Binding Ack message to the SGW, where the Create Default Bearer Response message or Proxy Binding Ack message carries information about multi-access capability of PGW 2. Also, PGW 2 may judge whether PGW 2 itself supports the multi-access function first. If PGW 2 supports the multi-access function, the Create Default Bearer Response message or the Proxy Binding Ack message carries information indicating that the PGW supports the multi-access function. If PGW 2 does not support the multi-access function, the Create Default Bearer Response message or the Proxy Binding Ack message carries information indicating that the PGW does not support the multi-access function. PGW 2 sends multi-access indication information according to the information indicating that the PGW supports the multi-access function or according to the information indicating that the PGW does not support the multi-access function.

406. The SGW sends a Create Default Bearer Response message to the MME.

After receiving multi-access indication information from PGW 2, the SGW forwards the multi-access indication information to the MME.

407. The MME sends a PDN Connectivity Accept message to the E-UTRAN.

If the MME receives multi-access indication information from the SGW, the MME may send an Attach Accept message that carries the multi-access indication information to the E-UTRAN.

It should be noted that if the MME has checked the subscription information and the UE is not authorized for multi-access, the MME may send non-authorization indication information to the E-UTRAN in this step, and send, according to the non-authorization indication information, multi-access indication information, so as to indicate that the UE is not authorized for multi-access.

If the multi-access indication information includes information about multi-access capability of PGW 2, the MME may first determine, according to the received information about multi-access capability of PGW 2, whether PGW 2 supports the multi-access function; if it is determined that PGW 2 supports the multi-access function, the MME sends information indicating that PGW 2 supports the multi-access function to the E-UTRAN; if it is determined that PGW 2 does not support the multi-access function, the MME sends information indicating that PGW 2 does not support the multi-access function to the E-UTRAN. The MME sends multi-access indication information according to the information indicating that PGW 2 supports the multi-access function or according to the information indicating that the PGW2 does not support the multi-access function.

It is understandable that if the multi-access indication information includes information about multi-access capability of PGW 2, the MME may send the multi-access indication information to the E-UTRAN directly.

If the multi-access indication information includes the information indicating that the PGW supports the multi-access function or the information indicating that the PGW does not support the multi-access function, the MME may send the multi-access indication information to the E-UTRAN directly.

408. The E-UTRAN sends an RRC Connection Reconfiguration message to the UE.

If the E-UTRAN receives multi-access indication information (information about multi-access capability of the PGW, or information indicating that the PGW supports the multi-access function, or information indicating that the PGW does not support the multi-access function, or non-authorization indication information) from the MME, the E-UTRAN sends an RRC Connection Reconfiguration message that carries the multi-access indication information to the UE.

409. The UE sends an RRC Connection Reconfiguration Complete message to the E-UTRAN.

410. The E-UTRAN sends a PDN Connectivity Complete message to the MME.

411. The MME sends an Update Bearer Request message to the SGW.

412. The bearer between the SGW and PGW 2 is updated.

413. The SGW sends an Update Bearer Response message to the MME.

414. The MME sends a Notify Request message to the HSS.

415. The HSS sends a Notify Response message to the MME.

In this embodiment, after receiving multi-access indication information, the UE may determine, according to the multi-access indication information, whether the UE can use the multi-access function. If the UE can use the multi-access function, the UE is allowed to initiate an access connectivity establishment request from multi-networks; if the UE cannot use the multi-access function, the UE is forbidden to initiate an access connectivity establishment request from multi-networks.

The detailed determining mode may be as follows:

If the multi-access indication information includes information about multi-access capability of PGW 2, where the information about multi-access capability of PGW 2 indicates that PGW 2 supports the multi-access function, and the UE itself supports the multi-access function, the UE determines that the multi-access function can be used. If information about multi-access capability of PGW 2 indicates that PGW 2 does not support the multi-access function, or the UE itself does not support the multi-access function, the UE determines that the multi-access function cannot be used.

If the multi-access indication information includes information indicates that the PGW supports the multi-access function, and the UE itself supports the multi-access function, the UE determines that the multi-access function can be used. If the multi-access indication information includes information indicates that the PGW does not support the multi-access function, or the UE itself does not support the multi-access function, the UE determines that the multi-access function cannot be used.

If the multi-access indication information includes non-authorization indication information, the UE determines that the multi-access function cannot be used no matter whether the UE itself supports the multi-access function.

The MME in this embodiment may be regarded as an access node. The access node may vary depending on the type of the application network. In the 3GPP network in this embodiment, the access node is an MME, but in practice, the access node may be other network element such as an SGSN. The data gateway in this embodiment is a PGW, but in practice, the data gateway may be a GGSN, a mobility anchor, or other network element, and is not limited herein.

It should be noted that when the MME selects a PGW for the UE, the selected PGW may be the PGW accessed by the current UE. That is, PGW 2 and PGW 1 are the same PGW. In this case, the MME may send the previously received multi-access indication information of PGW 1 to the UE.

Figure 5A:
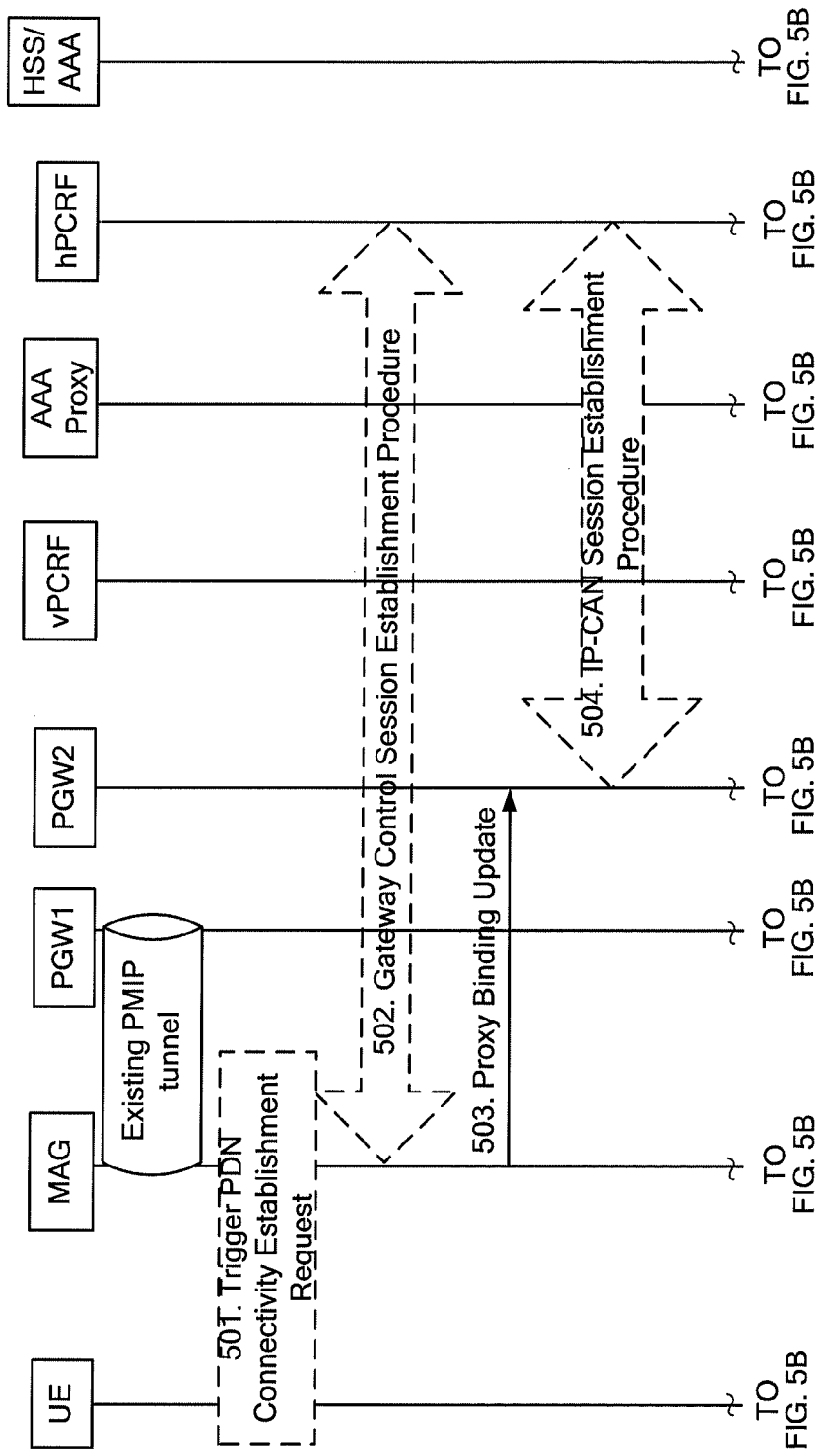
FIG. 5A and FIG. 5B are a schematic diagram of a multi-network access control method according to still another embodiment of the present invention.
Figure 5B:
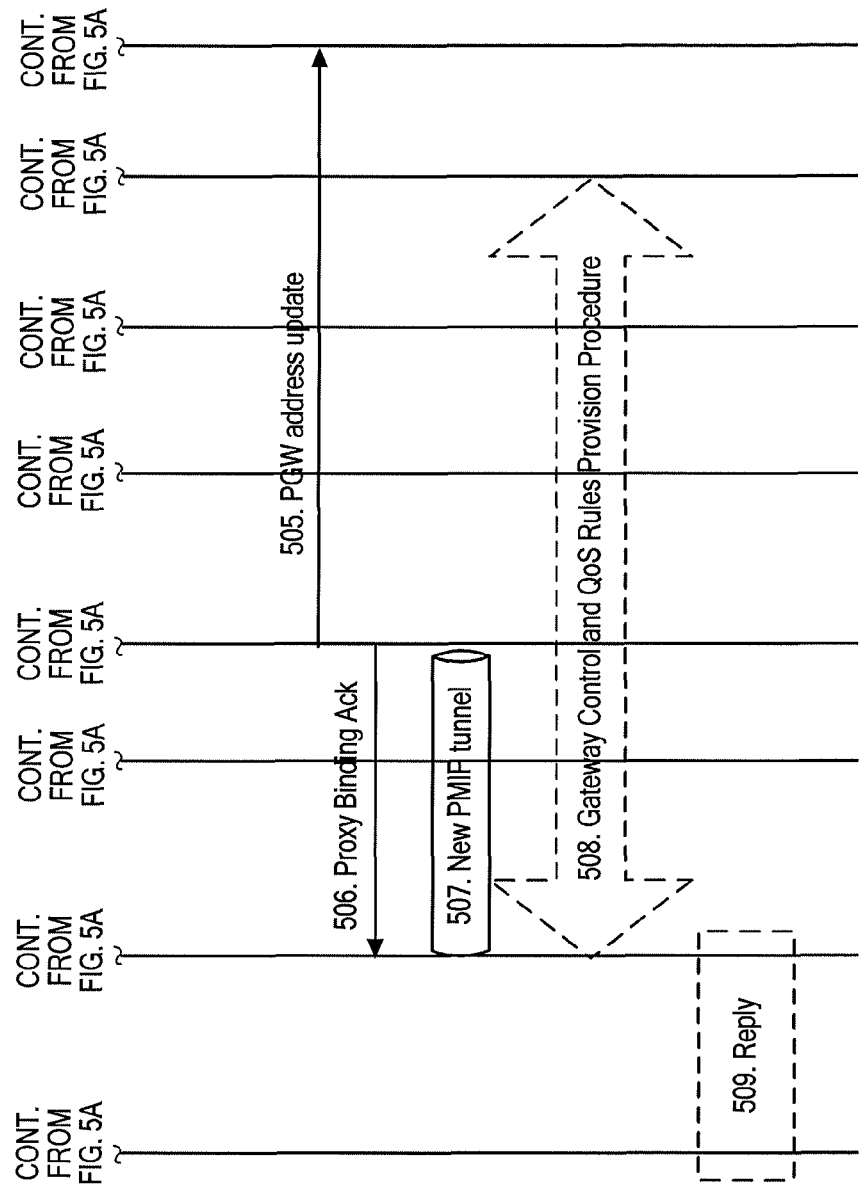

In the foregoing embodiment, the PDN connectivity request procedure in a 3GPP network is taken as an example. In practice, the UE may obtain the multi-access indication information through a PDN connectivity request procedure in a non-3GPP network. In a non-3GPP network, the access node may be a MAG, and the data gateway may be a PGW. As shown in FIG. 5A and FIG. 5B, another embodiment of the present invention provides a multi-network access control method, including the following steps:

501. A new PDN Connectivity Request is triggered.

In this embodiment, after the UE establishes a PMIP tunnel to PGW 1 through the MAG, if the UE needs to establish a new PDN connection to PGW 2, the UE may send a PDN Connectivity Request that carries information about multi-access capability of the UE or an indication of requesting multi-access indication information. A new field may be added in the PDN Connectivity Request to carry the information about multi-access capability of the UE or the indication of requesting multi-access indication information, or carry other form of indication information, so as to request the MAG to feed back multi-access indication information.

In this embodiment, the MAG is an access node, and specifically, may be an IP access gateway of a non-3GPP network or an EPDG.

If the UE subscription information obtained by the MAG includes no information indicating whether the UE is authorized for multi-access, or, if the subscription information indicates that the UE is authorized for multi-access, the message sent by the MAG to PGW 2 may carry the information about multi-access capability of the UE or the indication of requesting multi-access indication information, where information about multi-access capability of the UE or the indication of requesting multi-access indication information is obtained by the MAG.

If the UE subscription information obtained by the MAG indicates that the UE is not authorized for multi-access, the message sent by the MAG to PGW 2 may carry no indication information, and the MAG proceeds according to an ordinary procedure.

In this embodiment, if the MAG obtains an indication of requesting multi-access indication information, the MAG may send a message that carries the indication of requesting multi-access indication information to PGW 2; if the MAG obtains information about multi-access capability of the UE, the MAG may judge whether the UE supports the multi-access function according to the information about multi-access capability of the UE, and does not send the message that carries the information about multi-access capability of the UE to PGW 2 unless the UE supports the multi-access function.

In practice, the check on the subscription information of the UE may be combined with the check on the information about multi-access capability of the UE. For example, the MAG does not send the information about multi-access capability of the UE to PGW 2 unless the subscription information indicates that the UE is authorized for multi-access and the UE supports the multi-access function.

It should be noted that the check on the subscription information of the UE and the check on the information about multi-access capability of the UE are not mandatory. In practice, the MAG may perform no check, but directly send the information about multi-access capability of the UE or the indication of requesting multi-access indication information to PGW 2.

502. A procedure for creating a gateway control session is initiated.

503. The MAG sends a Proxy Binding Update message to PGW 2.

This message carries information about multi-access capability of the UE or an indication of requesting multi-access indication information.

504. PGW 2 initiates a procedure for creating an IP-CAN session between PGW 2 and a PCRF.

505. PGW 2 requests the AAA server/HSS to update the user's PGW identifier of the PDN connection and an APN.

506. PGW 2 sends a Proxy Binding Ack message to the MAG.

If PGW 2 receives the information about multi-access capability of the UE from the MAG, PGW 2 may check, according to the information about multi-access capability of the UE, whether the UE supports the multi-access function; if it is determined that the UE supports the multi-access function, PGW 2 sends a Proxy Binding Ack message that carries information about multi-access capability of PGW 2 to the MAG, and sends multi-access indication information according to information about multi-access capability of the PGW. If it is determined that the UE does not support the multi-access function, PGW 2 sends a Proxy Binding Ack message which may not carry information about multi-access capability of PGW 2.

If PGW 2 receives from the MAG an indication of requesting multi-access indication information, PGW 2 may directly send a Proxy Binding Ack message that carries information about multi-access capability of PGW 2 to the MAG, and send multi-access indication information according to information about multi-access capability of the PGW.

It should be noted that the check on the information about multi-access capability of the UE is not mandatory. In practice, PGW 2 may perform no check, but directly send a Proxy Binding Ack message that carries information about multi-access capability of PGW 2 to the MAG.

In this embodiment, PGW 2 may send a Proxy Binding Ack message that carries information about multi-access capability of PGW 2 to the MAG. Also, PGW 2 may first judge whether PGW 2 itself supports the multi-access function. If PGW 2 supports the multi-access function, the Proxy Binding Ack message carries information indicating that the PGW supports the multi-access function. If PGW 2 does not support the multi-access function, the Create Default Bearer Response message or the Proxy Binding Ack message carries information indicating that the PGW does not support the multi-access function. PGW 2 sends multi-access indication information according to the information indicating that the PGW supports the multi-access function or according to the information indicating that the PGW does not support the multi-access function.

507. A new PMIP tunnel is established between PGW 2 and the MAG.

508. A PCRF may initiate a procedure for modifying a gateway control session to update QoS information in the MAG.

509. The MAG sends a Reply message to the UE.

If the MAG receives multi-access indication information from PGW 2, the MAG may send a Reply message that carries the multi-access indication information to the UE.

It should be noted that if the MAG previously checks the subscription information and the UE is not authorized for multi-access, the MAG may send non-authorization indication information to the UE in this step, and send multi-access indication information according to the non-authorization indication information to indicate that the UE is not authorized for multi-access.

If the multi-access indication information includes information about multi-access capability of PGW 2, the MAG may first determine, according to information about multi-access capability of PGW 2, whether PGW 2 supports the multi-access function; if it is determined that PGW 2 supports the multi-access function, the MAG sends information indicating that PGW 2 supports the multi-access function to the UE; if it is determined that PGW 2 does not support the multi-access function, the MAG sends information indicating that PGW 2 does not support the multi-access function to the UE. The MAG sends multi-access indication information according to the information indicating that PGW 2 supports the multi-access function or according to the information indicating that the PGW2 does not support the multi-access function.

It is understandable that if the multi-access indication information includes information about multi-access capability of PGW 2, the MME may send the multi-access indication information to the E-UTRAN directly.

If the multi-access indication information includes the information indicating that the PGW supports the multi-access function or the information indicating that the PGW does not support the multi-access function, the MME may send the multi-access indication information to the E-UTRAN directly.

In this embodiment, after receiving multi-access indication information, the UE may determine, according to the multi-access indication information, whether the UE can use the multi-access function. If the UE can use the multi-access function, the UE is allowed to initiate an access connectivity establishment request from multi-networks; if the UE cannot use the multi-access function, the UE is forbidden to initiate an access connectivity establishment request from multi-networks.

The detailed determining mode may be as follows:

If the multi-access indication information includes information about multi-access capability of PGW 2, where the information about multi-access capability of PGW 2 indicates that PGW 2 supports the multi-access function, and the UE itself supports the multi-access function, the UE determines that the multi-access function can be used. If information about multi-access capability of PGW 2 indicates that PGW 2 does not support the multi-access function, or the UE itself does not support the multi-access function, the UE determines that the multi-access function cannot be used.

If the multi-access indication information includes information indicates that the PGW supports the multi-access function, and the UE itself supports the multi-access function, the UE determines that the multi-access function can be used. If the multi-access indication information includes information indicates that the PGW does not support the multi-access function, or the UE itself does not support the multi-access function, the UE determines that the multi-access function cannot be used.

If the multi-access indication information includes non-authorization indication information, the UE determines that the multi-access function cannot be used no matter whether the UE itself supports the multi-access function.

It should be noted that when the MME selects a PGW for the UE, the selected PGW may be the PGW accessed by the current UE. That is, PGW 2 and PGW 1 are the same PGW. In this case, the MME may send the previously received multi-access indication information of PGW 1 to the UE.

In this embodiment, the UE may send a PDN Connectivity Request to the MAG to obtain multi-access indication information, and the UE does not initiate an access connectivity establishment request from multi-networks unless the UE can use the multi-access function. Therefore, after the UE uses the multi-access function to switch part of services on the PDN connection to a 3GPP network, the remaining services not switched to the 3GPP network can also keep in normal communication, and the normal communication can be continued without interruption.

III. Dynamic Host Configuration Protocol (DHCP) Request Procedure

The obtaining of multi-access indication information in a request procedure in this embodiment includes the following steps:

(1) The UE sends a request message to a network device.

In this embodiment, when the UE requests address allocation, or authentication, or DHCP discovery, the UE may send a corresponding request message to a network device, so as to request the network device to feed back multi-access indication information.

(2) The network device sends a response message that carries locally stored multi-access indication information to the UE.

In this embodiment, information about capability of the network device is preset in the network device. After the network device receives a request message from the UE, the response message fed back by the network device to the UE may carry the preset information about capability of the network device, or the network device checks the information about capability of the network device first and then sends multi-access indication information directly according to the information indicating that the network device supports the multi-access function or according to the information indicating that the network device does not support the multi-access function.

Figure 6:
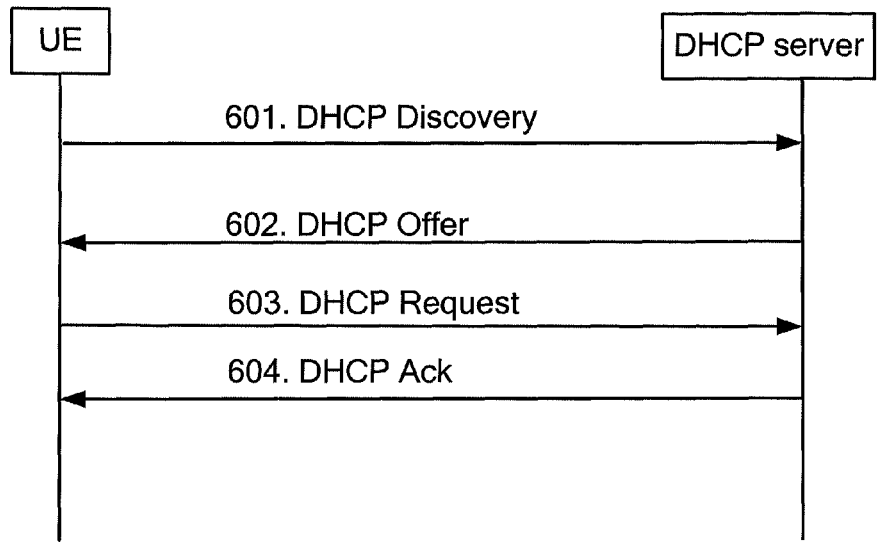
FIG. 6 is a schematic diagram of a multi-network access control method according to still another embodiment of the present invention.

How the UE obtains multi-access indication information from a network device in a request procedure is described above. For ease of understanding, a DHCP discovery procedure is taken as an example for detailed description. As shown in FIG. 6, another embodiment of the present invention provides a multi-network access control method, including the following steps:

601. The UE broadcasts a DHCP Discovery message in a network.

In this embodiment, after the UE accesses the network, if the network supports DHCP, the UE may broadcast a DHCP Discovery message to all network elements in the network, so as to discover a DHCP server and request the DHCP server to allocate the corresponding address.

The DHCP Discovery message may carry an indication of requesting multi-access indication information or information about multi-access capability of the UE, and is intended to request the DHCP server to feed back multi-access indication information. The multi-access indication information in this embodiment may include information about capability of the network device, or directly indicate whether the network device supports the multi-access function. In this embodiment, the multi-access capability of a PGW that is assumed to be the network device capability is taken as an example for description. In practice, if other network element provides data services for the UE, the capability of the network element is obtained to be regarded as the network device capability. The type of the network element is not limited herein.

In this embodiment, the DHCP Discovery message may carry neither an indication of requesting multi-access indication information nor information about multi-access capability of the UE. In this case, according to a policy preset by the operator, the DHCP server feeds back multi-access indication information to the UE after receiving the DHCP Discovery message.

602. The DHCP server sends a DHCP Offer message to the UE after receiving a DHCP Discovery message.

After receiving the DHCP Discovery message, the DHCP server determines it necessary to feed back multi-access indication information according to the indication of requesting multi-access indication information or the information about multi-access capability of the UE. Therefore, the DHCP server searches a locally preset database for information about multi-access capability of the PGW, and sends a DHCP Offer message that carries multi-access indication information to the UE according to information about multi-access capability of the PGW.

If the DHCP Discovery message received by the DHCP server carries neither the indication of requesting multi-access indication information nor the information about multi-access capability of the UE, the DHCP server may search for information about multi-access capability of the PGW according to the policy preset by the operator, and send a DHCP Offer message that carries multi-access indication information to the UE according to information about multi-access capability of the PGW.

It should be noted that if the DHCP Discovery message carries the information about multi-access capability of the UE, the DHCP server may first judge whether the UE supports the multi-access function. When the UE supports the multi-access function, the DHCP server searches for information about multi-access capability of the PGW, and feeds back, according to information about multi-access capability of the PGW, a DHCP Offer message that carries multi-access indication information to the UE.

It is understandable that the DHCP server may not check the information about multi-access capability of the UE, but may search for information about multi-access capability of the PGW directly, and may feedback, according to information about multi-access capability of the PGW, a DHCP Offer message that carries multi-access indication information to the UE.

In this embodiment, the DHCP server may first determine, according to information about multi-access capability of the PGW, whether the PGW supports the multi-access function. If the PGW supports the multi-access function, the DHCP server sends information indicating that the PGW supports the multi-access function to the UE; if the PGW does not support the multi-access function, the DHCP server sends information indicating that the PGW does not support the multi-access function to the UE. The DHCP server sends multi-access indication information according to the information indicating that the PGW supports the multi-access function or according to the information indicating that the PGW does not support the multi-access function.

603. The UE broadcasts a DHCP Request message in a network.

604. The DHCP server sends a DHCP Ack message to the UE.

In this embodiment, the UE requests the multi-access indication information from the DHCP server through step 601, and the DHCP server sends the multi-access indication information to the UE through step 602. In practice, the UE may request the multi-access indication information from the DHCP server through step 603, and the DHCP server may send the multi-access indication information to the UE through step 604.

In this embodiment, after receiving multi-access indication information, the UE may determine, according to the multi-access indication information, whether the UE can use the multi-access function. If the UE can use the multi-access function, the UE is allowed to initiate an access connectivity establishment request from multi-networks; if the UE cannot use the multi-access function, the UE is forbidden to initiate an access connectivity establishment request from multi-networks.

The detailed determining mode may be as follows:

If the multi-access indication information includes information about multi-access capability of the PGW, where the information about multi-access capability of the PGW indicates that the PGW supports the multi-access function, and the UE itself supports the multi-access function, the UE determines that the multi-access function can be used. If information about multi-access capability of the PGW indicates that the PGW does not support the multi-access function, or the UE itself does not support the multi-access function, the UE determines that the multi-access function cannot be used.

If the multi-access indication information includes information indicates that the PGW supports the multi-access function, and the UE itself supports the multi-access function, the UE determines that the multi-access function can be used. If the multi-access indication information includes information indicates that the PGW does not support the multi-access function, or the UE itself does not support the multi-access function, the UE determines that the multi-access function cannot be used.

In this embodiment, the UE may send a DHCP Discovery message to the DHCP server so as to request the DHCP server to feed back multi-access indication information; after receiving the DHCP Discovery message, the DHCP server may search a locally preset database for the multi-access indication information, and send a DHCP Offer message that carries the multi-access indication information to the UE. In this way, the UE obtains the multi-access indication information, and judges whether the UE can use the multi-access function according to the multi-access indication information. The UE does not initiate an access connectivity establishment request from multi-networks unless the UE determines that the UE can use the multi-access function. Therefore, after the UE uses the multi-access function to switch part of services on the PDN connection to a 3GPP network, the remaining services not switched to the 3GPP network can also keep in normal communication, and the normal communication can be continued without interruption.

Figure 7:
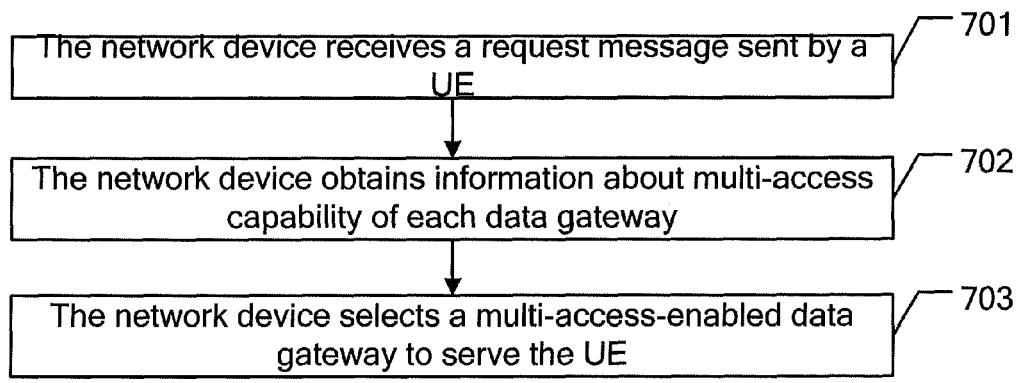
FIG. 7 is a schematic diagram of a multi-network access control method according to still another embodiment of the present invention.

The foregoing embodiments describe how a network device delivers multi-access indication information to the UE. The multi-access indication information prevents network communication interruption caused by multi-access. Another embodiment of the present invention provides a multi-network access control method to avoid network communication interruption in a multi-access scenario. As shown in FIG. 7, this multi-network access control method includes the following steps:

701. A network device receives a request message sent by a UE.

In this embodiment, in certain procedures such as the attach procedure and authentication procedure, the network device receives a request message from the UE, where the request message may carry information about multi-access capability of the UE or indication information. The information about multi-access capability of the UE or the indication information indicates that the UE may initiate an access connectivity establishment request from multi-networks.

It is understandable that the request message in this embodiment may carry neither the information about multi-access capability of the UE nor the indication information. In this case, according to a policy preset by the operator, the network device determines that the UE may initiate an access connectivity establishment request from multi-networks after the request message is received.

702. The network device obtains the information about multi-access capability of each data gateway.

After receiving the request message from the UE, the network device may obtain the information about multi-access capability of all data gateways in the current network, and regard such information as the information about capability of the network.

703. According to the information about multi-access capability of each data gateway, the network device selects a multi-access-enabled data gateway to serve the UE.

The network device may select a multi-access-enabled data gateway to serve the UE after obtaining the information about multi-access capability of every data gateway in the current network.

In this embodiment, after receiving a request from the UE, the network device selects a multi-access-enabled data gateway to serve the UE among the current data gateways. Therefore, the data gateway that serves the UE supports the multi-access function; after the UE uses the multi-access function to switch part of services on the PDN connection to a 3GPP network, the remaining services not switched to the 3GPP network can also keep in normal communication, and the normal communication can be continued without interruption.

For ease of understanding, the following describes a multi-network access control method used in an Attach Request procedure in an embodiment of the present invention. The multi-network access control method used in an Attach Request procedure may include the following steps:

(1) A UE sends an Attach Request to an access node.

When the UE enters an area covered by a network, the UE sends an Attach Request to an access node in the network to get attached to the network first.

In this embodiment, the Attach Request may carry information about multi-access capability of the UE. The information about multi-access capability of the UE indicates whether the UE supports the multi-access function. Alternatively, the Attach Request carries indication information which instructs the access node to feed back information about capability of the network device. It is understandable that the Attach Request in this embodiment may carry no such parameters.

In this embodiment, the information about multi-access capability of the UE or the indication information may be carried in reserved bits of the Attach Request; or, a new field is added in the Attach Request to carry the information about multi-access capability of the UE or the indication information. The specific carrying mode is not limited here.

(2) The access node obtains the information about multi-access capability of each data gateway in the current network.

After receiving the Attach Request sent by the UE, the access node queries information about multi-access capability of the data gateway configured statically on the access node, or obtains the information about multi-access capability of each data gateway in the current network through resolution performed by a Domain Name Server (DNS).

It is understandable that the access node may obtain the information about multi-access capability of each data gateway in the current network by other means, which are not limited herein.

It should be noted that in this embodiment, the access node may check the UE subscription information or check the information about multi-access capability of the UE before obtaining the information about multi-access capability of each data gateway in the current network. The check mode is similar to the check mode described in the preceding embodiments, and is not repeated herein.

(3) The access node selects a multi-access-enabled data gateway to serve the UE.

After obtaining the information about multi-access capability of every data gateway in the current network, the access node may select a multi-access-enabled data gateway among the data gateways to serve the UE. It should be noted that if the access node fails to select a multi-access-enabled data gateway, the access node sends selection failure information to the UE, indicating failure of selecting the multi-access-enabled data gateway. That is, the UE is not allowed to use the multi-access function.

In this embodiment, the causes for failure of selecting a multi-access-enabled data gateway may be: None of the data gateways in the current network supports the multi-access function, or the multi-access-enabled data gateways in the current network are overloaded.

If the UE receives selection failure information from the access node, it indicates that the access node fails to select a multi-access-enabled data gateway. In this case, the UE is forbidden to initiate an access connectivity establishment request from multi-networks. If the UE receives no selection failure information from the access node, it indicates that the access node succeeds in selecting a multi-access-enabled data gateway, and the UE is allowed to initiate an access connectivity establishment request from multi-networks.

Figure 8A:
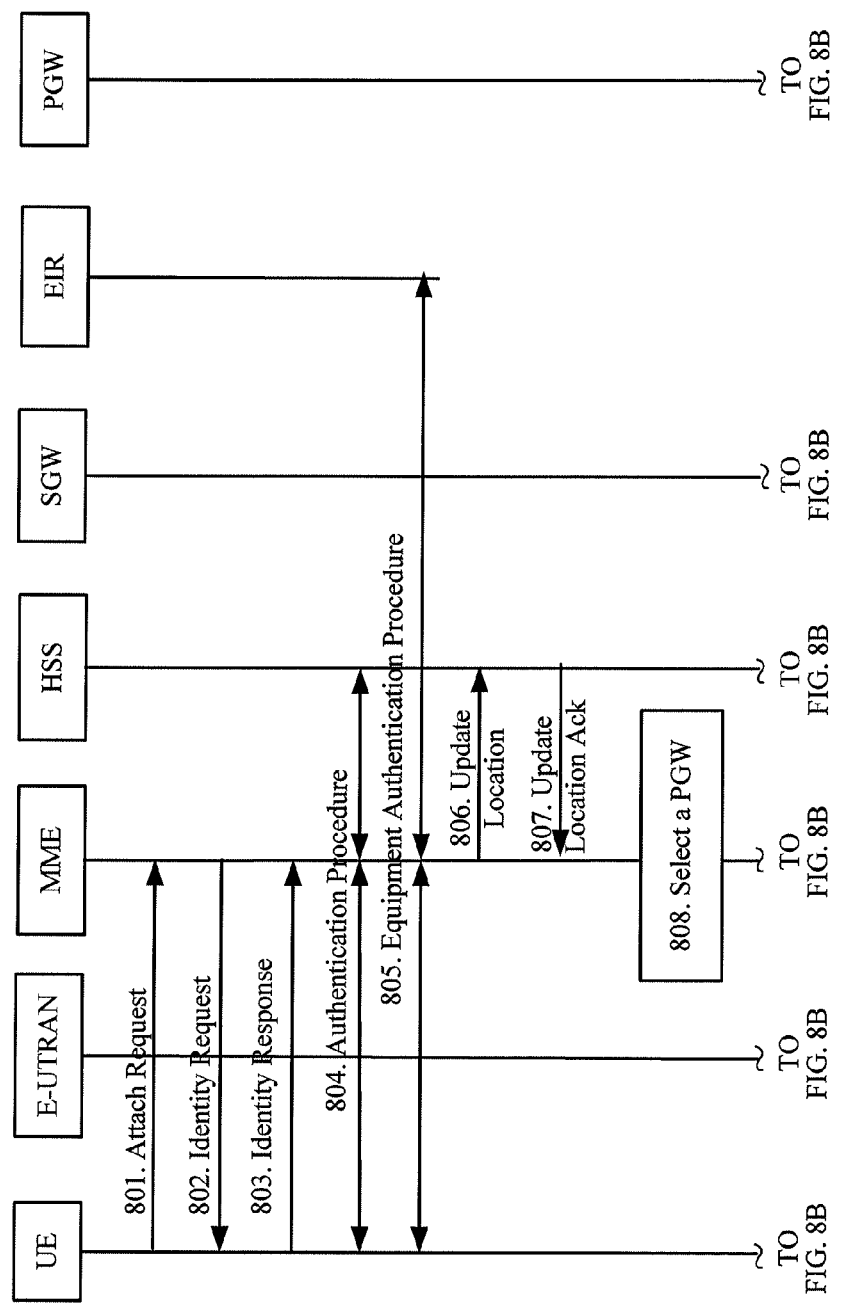
FIG. 8A and FIG. 8B are a schematic diagram of a multi-network access control method according to still another embodiment of the present invention.
Figure 8B:
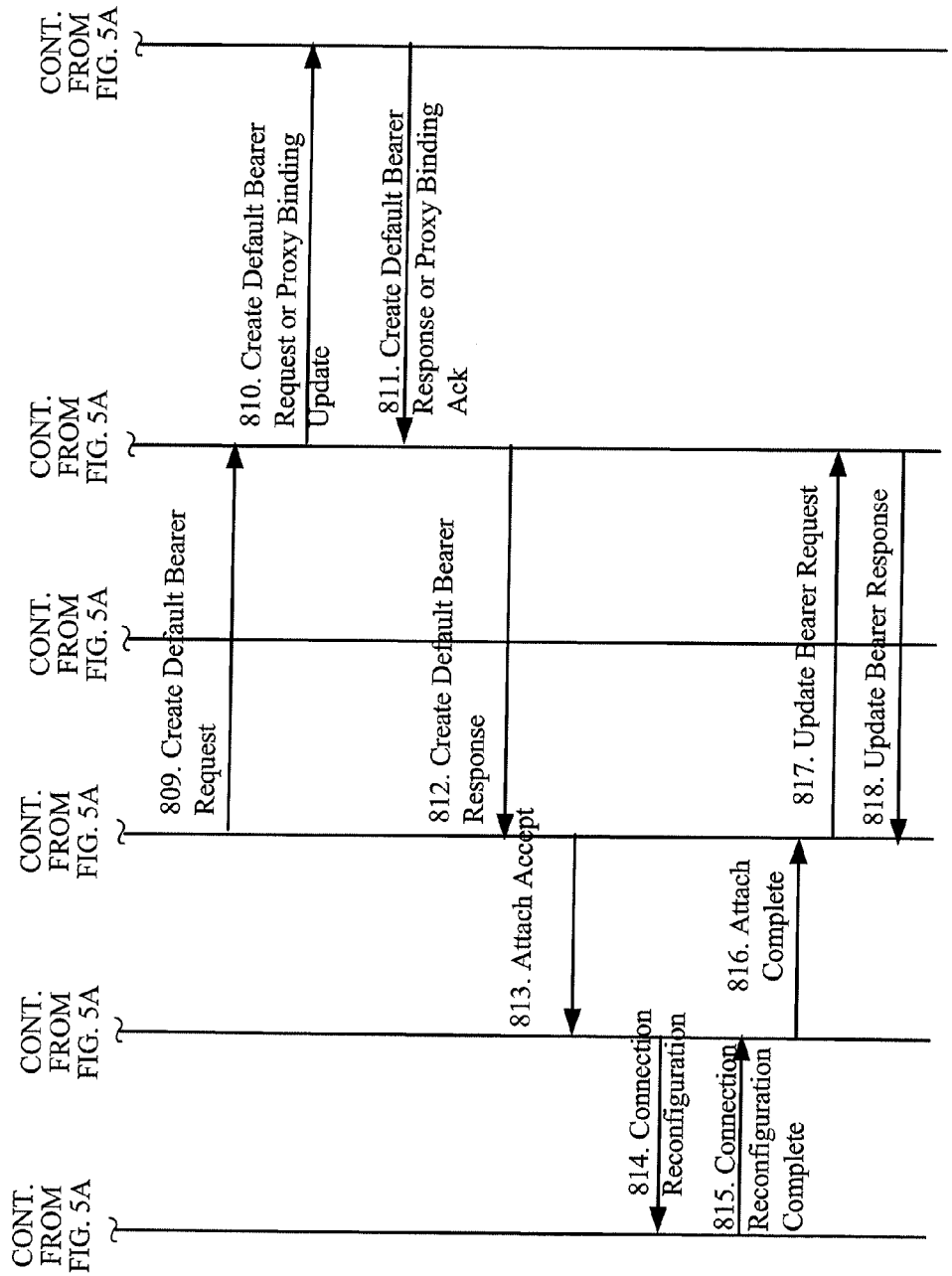

How an access node selects a data gateway in an attach procedure is described above. In different networks, the network elements that act as the access node and the data gateway may be different. In a 3GPP network, the access node may be an MME and the data gateway may be a PGW. In the following detailed description, a 3GPP network is taken as an example. As shown in FIG. 8A and FIG. 8B, another embodiment of the present invention provides a multi-network access control method, including the following steps:

801. A UE sends an Attach Request to an MME in the access network.

When the UE enters an area covered by a network, the UE sends an Attach Request to the MME in the network to get attached to the network first.

In this embodiment, the Attach Request may carry information about multi-access capability of the UE. The information about multi-access capability of the UE indicates whether the UE supports the multi-access function. Alternatively, the Attach Request carries indication information which indicates that the UE may initiate an access connectivity establishment request from multi-networks.

In this embodiment, the information about multi-access capability of the UE or the indication information may be carried in reserved bits of the Attach Request; or, a new field is added in the Attach Request to carry the information about multi-access capability of the UE or the indication information. The specific carrying mode is not limited here.

802. The MME sends an Identity Request to the UE.
803. The UE sends an Identity Response to the MME.
804. Mutual authentication is performed between the MME and the UE through an HSS.
805. The MME authenticates the UE through an EIR (IMEI Check).

Steps 802-805 are an authentication process, which includes identity authentication and equipment authentication.

It should be noted that in practice, if the security and reliability of the UE and the MME can be ensured, or the attach procedure is not much sensitive to security, steps 802-805 may not be executed.

806. The MME updates the location information of the UE in the HSS.

807. The MME receives an Update Location Ack message from the HSS, and obtains the subscription information of the UE at the same time.

808. The MME selects a PGW.

If the subscription information obtained by the MME in step 807 includes no information indicating whether the UE is authorized for multi-access, or, if the subscription information indicates that the UE is authorized for multi-access, the MME selects a multi-access-enabled PGW preferentially when selecting a PGW.

If the Attach Request message from the UE carries information about multi-access capability of the UE, the MME may further judge, according to the information about multi-access capability of the UE, whether the UE supports the multi-access function; and, if the UE supports the multi-access function, the MME selects a multi-access-enabled PGW preferentially when selecting a PGW.

In practice, the check on the subscription information of the UE may be combined with the check on the information about multi-access capability of the UE. For example, the MME does not preferentially select a multi-access-enabled PGW at the time of selecting a PGW, unless the subscription information indicates that the UE is authorized for multi-access and the UE supports the multi-access function.

The MME in this embodiment may select a multi-access-enabled PGW in the following way: selecting a multi-access-enabled PGW statically configured by the MME; or first obtaining information about the services, which are supported by each PGW, through DNS resolution, and then selecting a multi-access-enabled PGW preferentially.

809. The MME sends a Create Default Bearer Request message to the SGW.

In this embodiment, the Create Default Bearer Request message sent by the MME to the SGW includes an address of the selected multi-access-enabled PGW.

810. If the SGW exchanges signaling with the PGW through a GTP protocol, the SGW sends a Create Default Bearer Request message to the PGW; if the SGW exchanges signaling with the PGW through a PMIP protocol, the SGW sends a Proxy Binding Update message to the PGW.

In this embodiment, the Create Default Bearer Request message received by the SGW from the MME includes an address of the selected multi-access-enabled PGW. Therefore, the SGW may send a Create Default Bearer Request message or a Proxy Binding Update message to the corresponding PGW according to this address.

811. If the SGW exchanges signaling with the PGW through a GTP protocol, the PGW sends a Create Default Bearer Response message to the SGW; if the SGW exchanges signaling with the PGW through a PMIP protocol, the PGW sends a Proxy Binding Ack message to the SGW.

812. The SGW sends a Create Default Bearer Response message to the MME.

813. The MME sends an Attach Accept message to the E-UTRAN.

If the MME fails to select a multi-access-enabled PGW in step 808, the Attach Accept message sent by the MME to the E-UTRAN includes selection failure information. The selection failure information indicates failure of selecting a multi-access-enabled PGW, that is, the UE is not allowed to use the multi-access function. The failure causes may be: No multi-access-enabled PGW exists in the current network, or the multi-access-enabled PGWs in the current network are overloaded, or other causes, which are not limited herein.

If the MME determines in step 808 that the subscription information indicates that the UE is not authorized for multi-access, the Attach Accept message sent by the MME to the E-UTRAN includes non-authorization indication indicating that the UE is not authorized for multi-access.

814. The E-UTRAN sends an RRC Connection Reconfiguration message to the UE.

If the E-UTRAN receives selection failure information or non-authorization indication information sent by the MME, the E-UTRAN sends an RRC Connection Reconfiguration message that carries the selection failure information or non-authorization indication information to the UE.

815. The UE sends an RRC Connection Reconfiguration Complete message to the E-UTRAN.

816. The E-UTRAN sends an Attach Complete message to the MME.

817. The MME sends an Update Bearer Request message to the SGW.

818. The SGW sends an Update Bearer Response message to the MME.

In this embodiment, if the UE receives no selection failure information sent by the network, the UE determines by default that the network can support the multi-access function.

If the UE receives neither selection failure information nor non-authorization indication information, the multi-access-enabled UE can initiate an access connectivity establishment from multi-networks.

The MME in this embodiment may be regarded as an access node. The access node may vary depending on the type of the application network. In the 3GPP network in this embodiment, the access node that is regarded as an MME is taken as an example, but in practice, the access node may be other network element such as an SGSN. The data gateway in this embodiment is a PGW, but in practice, the data gateway may be a GGSN, a mobility anchor, or other network element, which is not limited herein.

In this embodiment, after receiving a request from the UE, the MME selects a multi-access-enabled PGW to serve the UE among the current PGWs. Therefore, the PGW that serves the UE may support the multi-access function; after the UE uses the multi-access function to switch part of services on the PDN connection to a 3GPP network, the remaining services not switched to the 3GPP network can also keep in normal communication, and the normal communication can be continued without interruption.

In this embodiment, the MME may determine, according to the information about multi-access capability of the UE, whether to obtain the information about capability of each PGW; and the MME may not obtain the information about capability of each PGW if it is determined that the UE does not support the multi-access function, which reduces MME operations and network load.

In this embodiment, the MME may check the subscription information of the UE, and may not obtain the information about capability of each PGW if the subscription information indicates that the UE is not authorized for multi-access, which further reduces MME operations and network load.

Figure 9A:
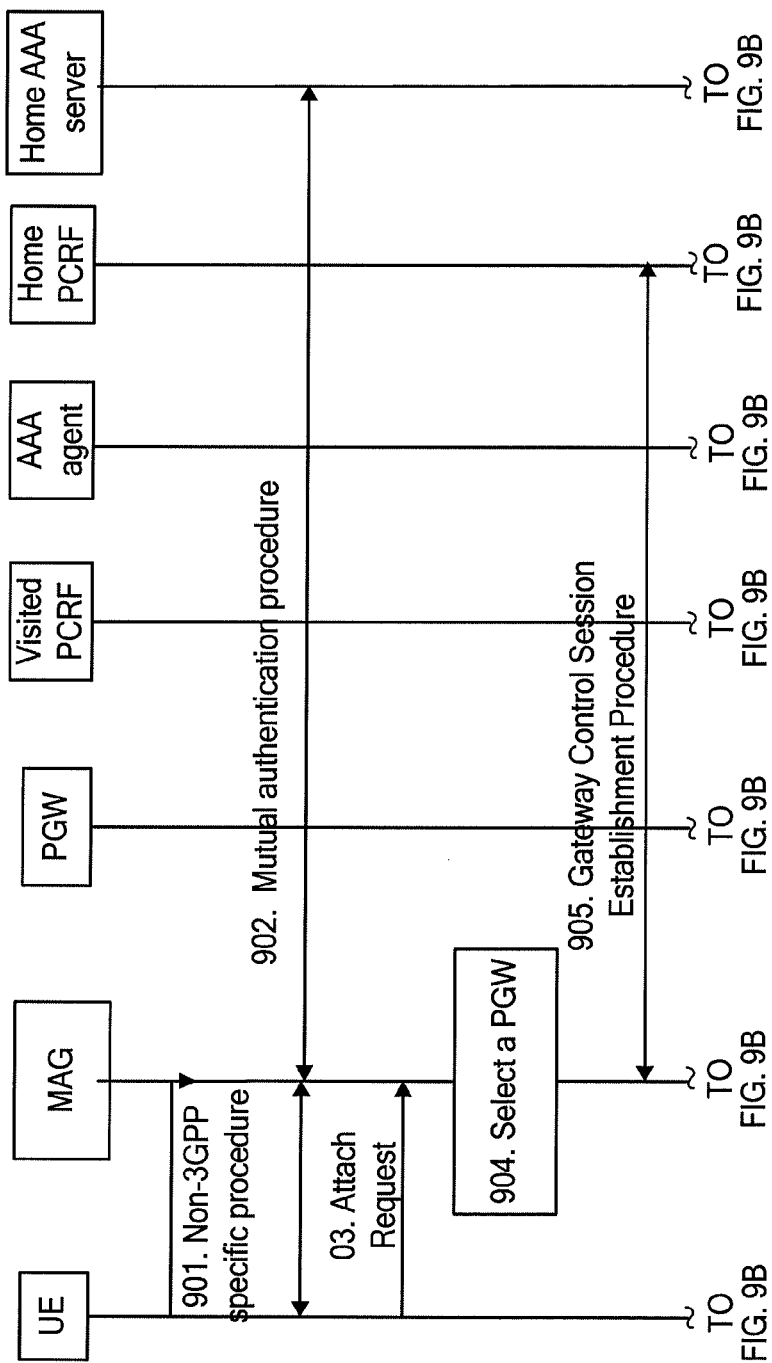
FIG. 9A and FIG. 9B are a schematic diagram of a multi-network access control method according to still another embodiment of the present invention.
Figure 9B:
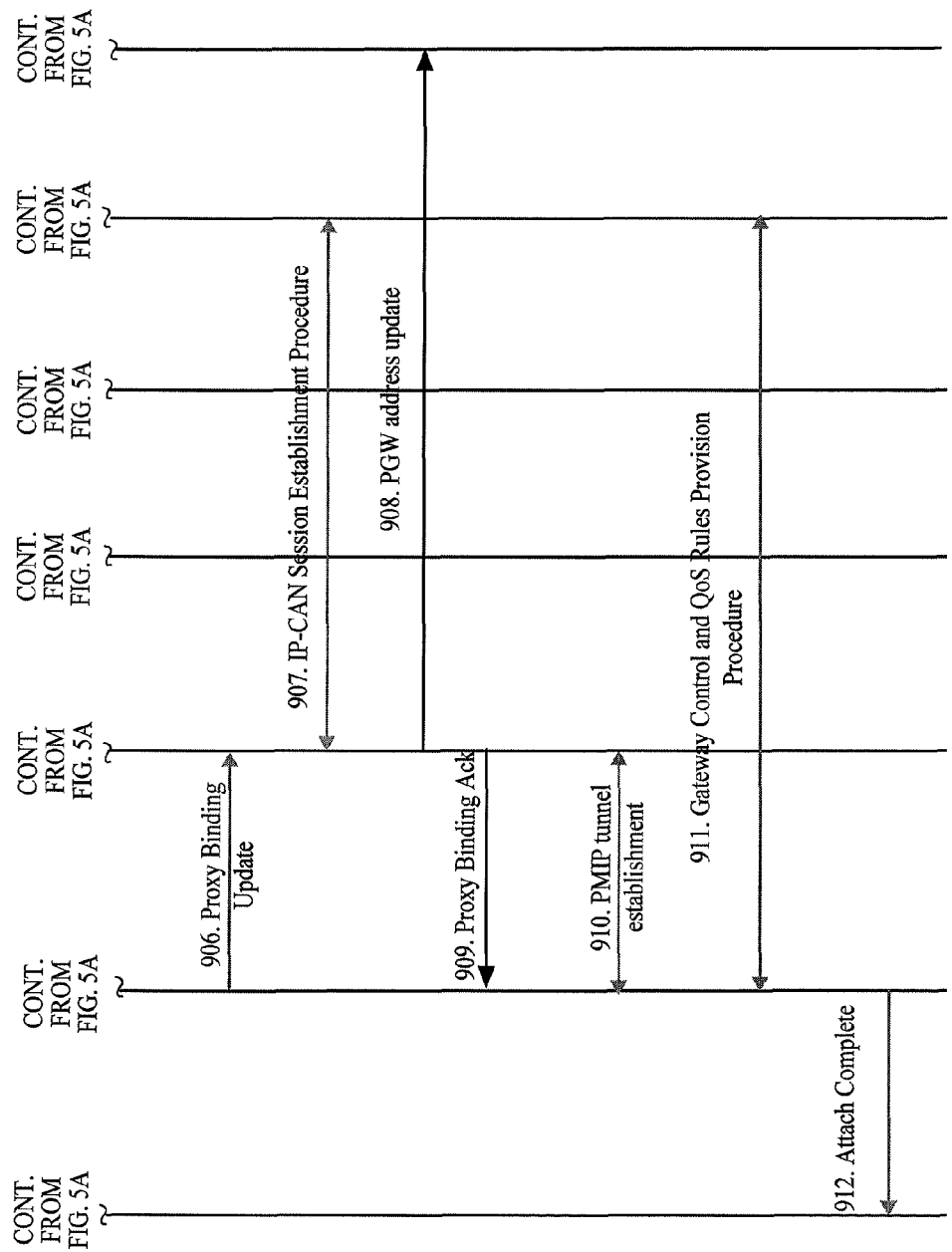

In the foregoing embodiment, the attach procedure in a 3GPP network is taken as an example. In practice, the access node may select a data gateway through an attach procedure in a non-3GPP network. In a non-3GPP network, the access node may be a MAG and the data gateway may be a PGW. As shown in FIG. 9A and FIG. 9B, another embodiment of the present invention provides a multi-network access control method, including the following steps:

901. The UE and the MAG perform a non-3GPP specific procedure.

In this embodiment, the MAG is an access node, and specifically, may be an IP access gateway of a non-3GPP network or an EPDG.

902. Authentication is performed between the UE and the MAG through an HSS or an AAA server.

In this embodiment, the MAG may obtain the subscription information of the UE through the HSS or AAA server.

903. The UE initiates an L3 Attach Trigger procedure to the MAG and sends an Attach Request to the MAG.

In this embodiment, the Attach Request may carry information about multi-access capability of the UE or may not carry information about multi-access capability of the UE.

904. The MAG selects a PGW.

If the subscription information obtained by the MAG in step 902 includes no information indicating whether the UE is authorized for multi-access, or, if the subscription information indicates that the UE is authorized for multi-access, the MAG selects a multi-access-enabled PGW preferentially when selecting a PGW.

If the Attach Request message from the UE carries information about multi-access capability of the UE, the MAG may further judge, according to the information about multi-access capability of the UE, whether the UE supports the multi-access function; and, if the UE supports the multi-access function, the MME selects a multi-access-enabled PGW preferentially when selecting a PGW.

In practice, the check on the subscription information of the UE may be combined with the check on the information about multi-access capability of the UE. For example, the MAG does not preferentially select a multi-access-enabled PGW at the time of selecting a PGW, unless the subscription information indicates that the UE is authorized for multi-access and the UE supports the multi-access function.

The MAG in this embodiment may select a multi-access-enabled PGW preferentially in the following way: selecting a multi-access-enabled PGW statically configured by the MAG; or first obtaining information about the services, which are supported by each PGW, through DNS resolution, and then selecting a multi-access-enabled PGW preferentially.

905. A procedure for creating a gateway control session is initiated.

906. The MAG sends a Proxy Binding Update message to the PGW.

907. The PGW initiates a procedure for creating an IP-CAN session between the PGW and a home PCRF.

908. The PGW updates the user's PGW identifier of the PDN connection and APN on the HSS/AAA server.

909. The PGW sends a Proxy Binding Ack message to the MAG.

910. A PMIP tunnel is established between the PGW and the MAG.

911. The home PCRF may initiate a Gateway Control and QoS Rules Provision Procedure for modifying the gateway control session to update QoS information in the MAG.

912. The attach procedure is complete.

If the MAG fails to select a multi-access-enabled PGW in step 904, the Attach Complete message sent by the MAG to the UE may include selection failure information. The selection failure information indicates failure of selecting a multiaccess-enabled PGW, that is, the UE is not allowed to use the multi-access function. The failure causes may be: No multi-access-enabled PGW exists in the current network, or the multi-access-enabled PGWs in the current network are overloaded, or other causes, which are not limited herein.

If the MAG determines in step 904 that the subscription information indicates that the UE is not authorized for multi-access, the Attach Complete message sent by the MAG to the UE may include non-authorization indication information indicating that the UE is not authorized for multi-access.

In this embodiment, if the UE receives no selection failure information sent by the MAG, the UE determines by default that the network can support the multi-access function.

If the UE receives neither selection failure information nor non-authorization indication information, the multi-access-enabled UE can initiate an access connectivity establishment from multi-networks.

It should be noted that in the embodiments shown in FIG. 8A, FIG. 8B, FIG. 9A, and FIG. 9B, the attach procedure is taken as an example. It can be understandable that the solution that the MAG selects a PGW can be implemented in other procedure, such as a PDN connectivity establishment request procedure. The specific procedure is not limited herein.

In this embodiment, after receiving a request from the UE, the MAG selects a multi-access-enabled PGW to serve the UE among the current PGWs. Therefore, the PGW that serves the UE can support the multi-access function; after the UE uses the multi-access function to switch part of services on the PDN connection to a 3GPP network, the remaining services not switched to the 3GPP network can also keep in normal communication, and the normal communication can be continued without interruption.

In this embodiment, the MAG may determine, according to the information about multi-access capability of the UE, whether to obtain the information about capability of each PGW; and the MAG may not obtain the information about capability of each PGW if it is determined that the UE does not support the multi-access function, which reduces MAG operations and network load.

In this embodiment, the MAG may check the subscription information of the UE, and may not obtain the information about capability of each PGW if the subscription information indicates that the UE is not authorized for multi-access, which further reduces MAG operations and network load.

Figure 10:
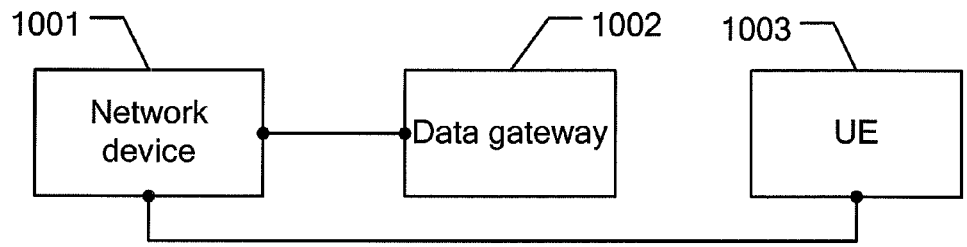
FIG. 10 is a schematic diagram of a communication system according to an embodiment of the present invention.

As shown in FIG. 10, an embodiment of the present invention provides a communication system, including:

a network device 1001, configured to obtain multi-access indication information, and send the multi-access indication information to a UE 1003;

the UE 1003, configured to: receive the multi-access indication information sent by the network device 1001, judge, according to the multi-access indication information, whether a multi-access function is used, and initiate an access connectivity establishment request from multi-networks if the multi-access function is used.

The communication system provided in this embodiment may further include:

a data gateway 1002, configured to send multi-access indication information to the network device 1001.

The network device 1001 in this embodiment may be an access node or a DHCP server.

It should be noted that the access node is further configured to receive an Attach Request or a PDN Connectivity Establishment Request sent by the UE 1003, and obtain the subscription information of the UE 1003.

If the subscription information includes no information indicating whether the UE 1003 is authorized for multi-access, or, if the subscription information indicates that the UE 1003 is authorized for multi-access, the access node obtains the multi-access indication information.

If the subscription information indicates that the UE 1003 is not authorized for multi-access, the access node sends multi-access indication information to the UE 1003 according to non-authorization indication information.

The Attach Request or the PDN Connectivity Establishment Request in this embodiment includes the information about multi-access capability of the UE, and the access node is further configured to: judge, according to the information about multi-access capability of the UE, whether the UE 1003 supports the multi-access function; send a PDN Connectivity Establishment Request message to the data gateway 1002 in the process of establishing a PDN connection if the UE supports the multi-access function, where the PDN Connectivity Establishment Request message carries the information about multi-access capability of the UE or an indication of requesting multi-access indication information, and the indication of requesting multi-access indication information is generated by the access node; and receive a PDN Connectivity Establishment Accept message sent by the data gateway 1002. The PDN Connectivity Establishment Accept message carries multi-access indication information.

The data gateway 1002 in this embodiment is further configured to: receive from the access node the PDN Connectivity Establishment Request message that carries the information about multi-access capability of the UE; judge, according to the information about multi-access capability of the UE, whether the UE supports the multi-access function; and send multi-access indication information according to the information about multi-access capability of the data gateway if the UE supports the multi-access function, where the multi-access indication information is carried in a PDN Connectivity Establishment Accept message and is sent to the access node.

Alternatively, the data gateway 1002 in this embodiment is further configured to: receive from the access node the PDN Connectivity Establishment Request message that includes the information about multi-access capability of the UE; judge, according to the information about multi-access capability of the UE, whether the UE supports the multi-access function; if the UE supports the multi-access function, judge whether the data gateway 1002 itself supports the multi-access function; if the data gateway itself supports the multi-access function, send multi-access indication information according to information indicating that the data gateway supports the multi-access function, where the information is carried in a PDN Connectivity Establishment Accept message and is sent to the access node; if the data gateway 1002 itself does not support the multi-access function, send multi-access indication information according to information indicating that the data gateway does not support the multi-access function, where the information is carried in the PDN Connectivity Establishment Accept message and is sent to the access node.

Figure 11:
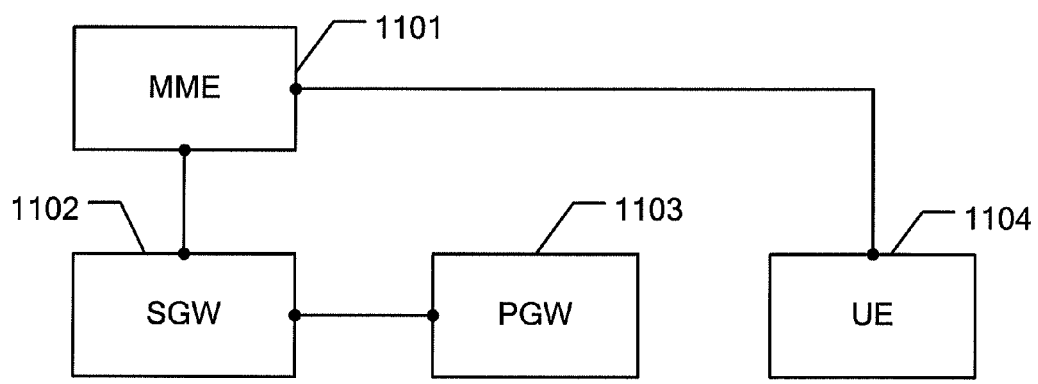
FIG. 11 is a schematic diagram of a communication system according to another embodiment of the present invention.

For ease of understanding, an example is given below to describe the communication system in a 3GPP network. As shown in FIG. 11, another embodiment of the present invention provides a communication system, including: an MME 1101, an SGW 1102, a PGW 1103, and a UE 1104.

In this embodiment, the MME 1101 and the SGW 1102 may act as access nodes, and the PGW 1103 may act as a data gateway.

The MME 1101 is configured to: receive an Attach Request sent by the UE 1104, where the Attach Request carries information about multi-access capability of the UE or an indication of requesting multi-access indication information, and the information about multi-access capability of the UE or the indication of requesting multi-access indication information is used to request the MME 1101 to feed back the multi-access indication information; forward the information about multi-access capability of the UE or the indication of requesting multi-access indication information to the SGW 1102, receive the multi-access indication information fed back by the SGW 1102, and send the multi-access indication information to the 1104.

The SGW 1102 is configured to: receive from the MME 1101 the information about multi-access capability of the UE or the indication of requesting multi-access indication information, forward the information about multi-access capability of the UE or the indication of requesting multi-access indication information to the PGW 1103, receive the multi-access indication information fed back by the PGW 1103, and feed back the multi-access indication information to the MME 1101.

The PGW 1103 is configured to receive from the SGW 1102 the information about multi-access capability of the UE or the indication of requesting multi-access indication information, and feed back the multi-access indication information to the SGW 1102.

The multi-access indication information in this embodiment may include information about multi-access capability of the PGW 1103, or information indicating that the PGW supports the multi-access function, or information indicating that the PGW does not support the multi-access function.

The UE 1104 is configured to receive the multi-access indication information sent by the MME 1101, judge, according to the multi-access indication information, whether a multi-access function is used, and initiate an access connectivity establishment request from multi-networks when the multi-access function is used.

The following describes an application scenario of the communication system provided in this embodiment.

When the UE 1104 enters an area covered by a network, the UE first sends an Attach Request to the MME 1101 in the network to get attached to the network.

The Attach Request in this embodiment may include information about multi-access capability of the UE 1104 or carry an indication of requesting multi-access indication information. A new field may be added in the Attach Request to carry the information about multi-access capability of the UE 1104 or the indication of requesting multi-access indication information, or carry other form of indication information which is used to request the MME 1101 to feed back the information about multi-access capability of the PGW 1103.

The MME 1101 sends a Create Default Bearer Request message to the SGW 1102. The Create Default Bearer Request message carries information about multi-access capability of the UE 1104 or an indication of requesting multi-access indication information.

The SGW 1102 sends a Create Default Bearer Request message or a Proxy Binding Update message to the PGW 1103. The Create Default Bearer Request message or the Proxy Binding Update message carries the information about multi-access capability of the UE 1104 or the indication of requesting multi-access indication information.

The PGW 1103 sends a Create Default Bearer Response message or a Proxy Binding Ack message to the SGW 1102. The Create Default Bearer Response message or the Proxy Binding Ack message carries multi-access indication information.

The multi-access indication information in this embodiment may include information about multi-access capability of the PGW 1103, or information indicating that the PGW supports the multi-access function, or information indicating that the PGW does not support the multi-access function.

The SGW 1102 sends a Create Default Bearer Response message to the MME 1101. The Create Default Bearer Response message carries multi-access indication information.

The MME 1101 sends multi-access indication information to the UE 1104 through an E-UTRAN.

The MME 1101 may obtain subscription information of the UE 1104 and check the subscription information. If the subscription information indicates that the UE 1104 is not authorized for multi-access, the MME 1101 may send multi-access indication information to the UE 1104 according to non-authorization indication information.

In this embodiment, after receiving multi-access indication information, the UE 1104 may determine, according to the multi-access indication information, whether the UE can use the multi-access function. If the UE can use the multi-access function, the UE 1104 is allowed to initiate an access connectivity establishment request from multi-networks; if the UE cannot use the multi-access function, the UE 1104 is forbidden to initiate an access connectivity establishment request from multi-networks.

The detailed determining mode may be as follows:

If the multi-access indication information includes information about multi-access capability of the PGW, where the information about multi-access capability of the PGW indicates that the PGW supports the multi-access function, and the UE 1104 itself supports the multi-access function, the UE 1104 determines that the multi-access function can be used. If information about multi-access capability of the PGW indicates that the PGW does not support the multi-access function, or the UE 1104 itself does not support the multi-access function, the UE 1104 determines that the multi-access function cannot be used.

If the multi-access indication information includes information indicates that the PGW supports the multi-access function, and the UE 1104 itself supports the multi-access function, the UE 1104 determines that the multi-access function can be used. If the multi-access indication information includes information indicates that the PGW does not support the multi-access function, or the UE 1104 itself does not support the multi-access function, the UE 1104 determines that the multi-access function cannot be used.

If the multi-access indication information includes non-authorization indication information, the UE 1104 determines that the multi-access function cannot be used no matter whether the UE 1104 itself supports the multi-access function.

In this embodiment, the UE 1104 may send an Attach Request to the MME 1101 so as to request the MME 1101 to feed back multi-access indication information; after receiving the Attach Request, the MME 1101 can obtain multi-access indication information from the PGW 1103 through the SGW 1102 in the process of creating a default bearer, and can feed back the multi-access indication information to the UE 1104. In this way, the UE 1104 can obtain the multi-access indication information, and judge, according to the multi-access indication information, whether the multi-access function is used. The UE 1104 does not initiate an access connectivity establishment request from multi-networks unless the multi-access function is used. Therefore, after the UE 1104 uses the multi-access function to switch part of services on the PDN connection to a 3GPP network, the remaining services not switched to the 3GPP network can also keep in normal communication, and the normal communication can be continued without interruption.

As shown in FIG. 10, another embodiment of the present invention provides a communication system, including:

a network device 1001, configured to: receive a request message sent by a UE 1003, obtain information about capability of each data gateway 1002, and select, according to the information about capability of each data gateway 1002, a multi-access-enabled data gateway 1002 to serve the UE 1003;

a data gateway 1002, configured to deliver the information about multi-access capability of the data gateway to the network device 1001; and the UE 1003, configured to send the request message to the network device 1001.

The data gateway in this embodiment may be a PGW.

The network device 1001 in this embodiment may be an access node.

It should be noted that the access node is further configured to receive the Attach Request or the PDN Connectivity Establishment Request sent by the UE 1003, and obtain the subscription information of the UE 1003.

If the subscription information includes no information indicating whether the UE 1003 is authorized for multi-access, or, when the subscription information indicates that the UE 1003 is authorized for multi-access, the access node obtains the information about capability of the network device.

If the subscription information indicates that the UE 1003 is not authorized for multi-access, the access node feeds back non-authorization indication information to the UE 1003.

In this embodiment, the Attach Request or the PDN Connectivity Establishment Request includes the information about multi-access capability of the UE; and the access node is further configured to judge, according to the information about the multi-access capability of the UE, whether the UE 1003 supports the multi-access function; if the UE supports the multi-access function, the access node obtains the information about capability of each data gateway 1002.

The network device 1001 in this embodiment is further configured to send selection failure information to the UE 1003 when no multi-access-enabled PGW is selected, where the selection failure information indicates failure of selecting a multi-access-enabled PGW, that is, the UE is not allowed to use the multi-access function.

The UE 1003 is further configured to judge whether selection failure information or non-authorization indication information is received from the network device 1001, and initiate an access connectivity establishment request from multi-networks if neither the selection failure information nor the non-authorization indication information is received.

In this embodiment, after receiving a request from the UE 1003, the network device 1001 selects a multi-access-enabled data gateway 1002 to serve the UE 1003 among the current data gateways 1002. Therefore, the data gateway 1002 that serves the UE 1003 can support the multi-access function; after the UE 1003 uses the multi-access function to switch part of services on the PDN connection to a 3GPP network, the remaining services not switched to the 3GPP network can also keep in normal communication, and the normal communication can be continued without interruption.

Figure 12:
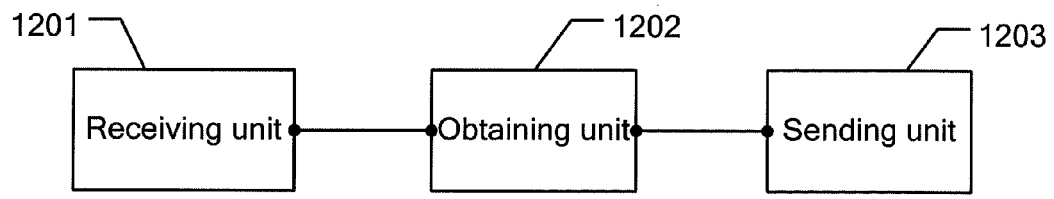
FIG. 12 is a schematic diagram of a network device according to an embodiment of the present invention.

As shown in FIG. 12, an embodiment of the present invention provides a network device, including:

an obtaining unit 1202, configured to obtain multi-access indication information; and a sending unit 1203, configured to send the multi-access indication information to a UE, where the multi-access indication information indicates whether the UE is allowed to use a multi-access function.

The network device in this embodiment may further include:

a receiving unit 1201, configured to receive a request message sent by the UE and trigger the obtaining unit 1202 to perform corresponding operations.

It should be noted that in this embodiment, the network device may include no receiving unit 1201. In this case, the sending unit 1203 actively sends multi-access indication information to the UE when preset conditions are fulfilled. The multi-access indication information indicates whether the UE can use the multi-access function. For example, the sending unit 1203 broadcasts the current multi-access indication information to the UE automatically at intervals; or, the sending unit 1203 broadcasts the current multi-access indication information to the UE upon detecting change of the multi-access indication information, or the sending unit 1203 broadcasts the current multi-access indication information to the UE when other preset conditions are fulfilled. The specific conditions are not limited herein.

For ease of understanding, the following describes an example of the network device:

When the UE enters an area covered by a network, the UE first sends an Attach Request to the network device in the network to get attached to the network; the receiving unit 1201 receives the Attach Request sent by the UE. The Attach Request may carry information about multi-access capability of the UE. The information about multi-access capability of the UE indicates whether the UE supports the multi-access function. Alternatively, the Attach Request carries an indication of requesting the multi-access indication information, and the indication of requesting the multi-access indication information is used for sending a request for feeding back the multi-access indication information.

After the receiving unit 1201 receives the Attach Request sent by the UE, in the process of creating a default bearer, the obtaining unit 1202 sends the information about multi-access capability or the indication of requesting multi-access indication information to the data gateway through an SGW so as to request multi-access indication information. Therefore, the data gateway returns multi-access indication information to the obtaining unit 1202 through the SGW.

After the obtaining unit 1202 obtains the multi-access indication information, the sending unit 1203 may send the multi-access indication information to the UE so that the UE exercises multi-network access control.

It should be noted that in this embodiment, the network device may obtain and check the subscription information of the UE, and/or check the information about multi-access capability of the UE. The detailed check and processing procedure is similar to the procedures in the embodiments shown in FIG. 2A, FIG. 2B, FIG. 3A, and FIG. 3B, and is not repeated herein.

In this embodiment, after the receiving unit 1201 receives the request message from the UE, the obtaining unit 1202 may obtain the multi-access indication information in the process of creating a default bearer. Therefore, the sending unit 1203 may send the multi-access indication information to the UE. The multi-access indication information indicates whether the UE can use the multi-access function so that the UE can exercise multi-network access control. In this way, after the UE uses the multi-access function to switch part of services on the PDN connection to a 3GPP network, the remaining services not switched to the 3GPP network can also keep in normal communication, and the normal communication can be continued without interruption.

Figure 13:
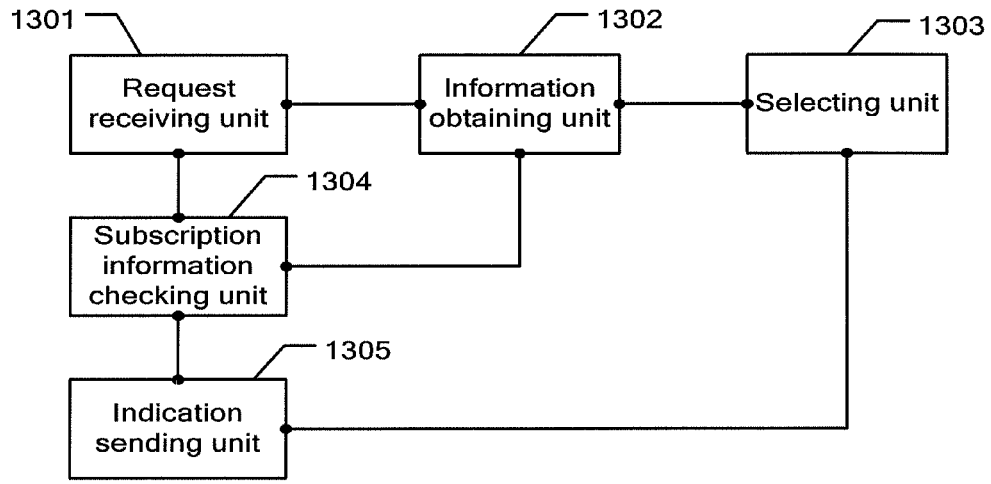
FIG. 13 is a schematic diagram of a network device according to another embodiment of the present invention.

As shown in FIG. 13, another embodiment of the present invention provides a network device, including:

a request receiving unit 1301, configured to receive a request message sent by a UE;

an information obtaining unit 1302, configured to obtain information about multi-access capability of each data gateway; and a selecting unit 1303, configured to select, according to the information about multi-access capability of each data gateway, a multi-access-enabled data gateway to serve the UE.

The network device in this embodiment may further include:

a subscription information checking unit 1304, configured to obtain subscription information of the UE, and trigger the information obtaining unit 1302 to perform corresponding operations if the subscription information includes no information indicating whether the UE is authorized for multi-access or if the subscription information indicates that the UE is authorized for multi-access.

The network device in this embodiment may further include:

an indication sending unit 1305, configured to: send non-authorization indication information to the UE if the subscription information of the UE indicates that the UE is not authorized for multi-access, where the non-authorization indication information indicates that the UE is not authorized for multi-access; send selection failure information to the UE when the selecting unit fails to select a multi-access-enabled data gateway, where the selection failure information indicates failure of selecting a multi-access-enabled data gateway, that is, the UE is not allowed to use the multi-access function.

The failure causes may be: No multi-access-enabled PGW exists in the current network, or the multi-access-enabled PGWs in the current network are overloaded, or other failure causes, which are not limited herein.

In this embodiment, after the request receiving unit 1301 receives the request from the UE, the selecting unit 1303 selects a multi-access-enabled data gateway to serve the UE among the current data gateways. Therefore, the data gateway that serves the UE supports the multi-access function; after the UE uses the multi-access function to switch part of services on the PDN connection to a 3GPP network, the remaining services not switched to the 3GPP network can also keep in normal communication, and the normal communication can be continued without interruption.

Figure 14:
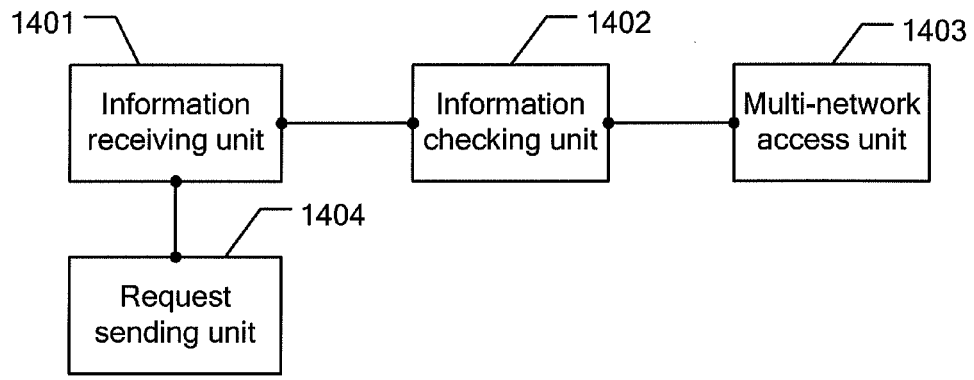
FIG. 14 is a schematic diagram of a UE according to an embodiment of the present invention.

As shown in FIG. 14, an embodiment of the present invention provides a UE, including:

an information receiving unit 1401, configured to receive multi-access indication information sent by a network device;

an information checking unit 1402, configured to judge, according to the multi-access indication information, whether a multi-access function is used; and a multi-network access unit 1403, configured to initiate an access connectivity establishment request from multi-networks when the multi-access function is used.

The UE in this embodiment may further include:

a request sending unit 1404, configured to: send a request message to the network device, where the request message carries information about multi-access capability of the UE or an indication of requesting multi-access indication information, and the information about multi-access capability of the UE or the indication of requesting multi-access indication information is used to request the network device to feed back multi-access indication information.

It should be noted that in this embodiment, if the network device actively sends information about capability of the network device, the request sending unit 1404 is not required; if the network device does not feed back multi-access indication information to the UE unless the UE initiates a request, the request sending unit 1404 is required.

The communication relationships between the units of the UE in this embodiment and the data procedure are similar to the operations of the UEs in the embodiments shown in FIG. 2A and FIG. 2B or FIG. 3A and FIG. 3B.

In this embodiment, the information receiving unit 1401 may obtain the multi-access indication information from the network device, and the information checking unit 1402 judges, according to the multi-access indication information, whether the multi-access function is used; and the multi-network access unit 1403 does not initiate an access connectivity establishment request from multi-networks unless the multi-access function is used. Therefore, after part of services on the PDN connection are switched to a 3GPP network, the remaining services not switched to the 3GPP network can also keep in normal communication, and the normal communication can be continued without interruption.

Figure 15:
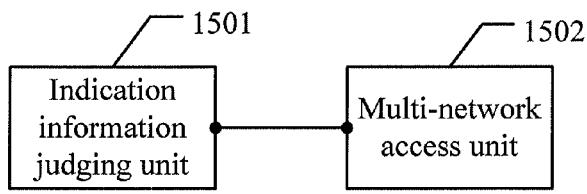
FIG. 15 is a schematic diagram of a UE according to another embodiment of the present invention.

As shown in FIG. 15, another embodiment of the present invention provides a UE, including:

an indication information judging unit 1501, configured to judge whether the UE receives non-authorization indication information or selection failure information sent by a network device, where the non-authorization indication information indicates that the UE is not authorized for multi-access, and the selection failure information indicates failure of selecting a multi-access-enabled data gateway, that is, the UE is not allowed to use the multi-access function; and a multi-network access unit 1502, configured to initiate an access connectivity establishment request from multi-networks when neither non-authorization indication information nor selection failure information is received.

For ease of understanding, the following describes an example of the UE in this embodiment:

When the UE enters an area covered by a network, the UE may first send an Attach Request to an access node in the network to get attached to the network.

After receiving an Attach Request sent by the UE, the access node may obtain the subscription information of the UE. If the subscription information indicates that the UE is not authorized for multi-access, the access node sends non-authorization indication information to the UE, indicating that the UE is not authorized for multi-access.

If the subscription information includes no information indicating whether the UE is authorized for multi-access, or, if the subscription information indicates that the UE is authorized for multi-access, the access node obtains the information about multi-access capability of each data gateway. Specifically, the access node queries the information about multi-access capability of the data gateways configured statically on the access node, or obtains the information about multi-access capability of each data gateway in the current network through DNS resolution.

It is understandable that the access node may obtain the information about multi-access capability of each data gateway in the current network by other means, which are not limited herein.

After obtaining the information about multi-access capability of every data gateway in the current network, the access node may select a multi-access-enabled data gateway among the data gateways to serve the UE. It should be noted that if the access node fails to select a multi-access-enabled data gateway, the access node sends selection failure information to the UE, where the selection failure information indicates failure of selecting the multi-access-enabled data gateway, that is, the UE is not allowed to use the multi-access function.

In this embodiment, the causes for failure of selecting a multi-access-enabled data gateway may be: None of the data gateways in the current network supports the multi-access function, or the multi-access-enabled data gateways in the current network are overloaded.

The indication information judging unit 1501 in the UE may judge whether selection failure information or non-authorization indication information is received from the access node. If either the selection failure information or the non-authorization indication information is received, it indicates that the multi-access function cannot be used normally, and the multi-network access unit 1502 is forbidden to initiate an access connectivity establishment request from multi-networks. That is, when the user requests to perform access from multi-networks, or when the UE needs to perform access from multi-networks upon change of the network environment, the multi-network access unit 1502 refuses to initiate an access connectivity establishment request to the corresponding target network.

If the indication information judging unit 1501 determines that neither the selection failure information nor the non-authorization indication information is received, the multi-network access unit 1502 is allowed to initiate an access connectivity establishment request from multi-networks. That is, when the user requests to perform access from multi-networks, the multi-network access unit 1502 sends an access connectivity establishment request to the corresponding target network; or when the UE needs to perform access from multi-networks upon change of the network environment, the UE sends an access connectivity establishment request to the corresponding target network.

It should be noted that in this embodiment, the UE itself is assumed to support the multi-access function. In practice, if it is not certain whether the UE itself supports the multi-access function, the multi-network access unit 1502 needs to judge whether the UE itself supports the multi-access function before sending an access connectivity establishment request. If the UE itself supports the multi-access function, the access from multi-networks unit 1502 sends an access connectivity establishment request; if the UE itself does not support the multi-access function, the multi-network access unit 1502 does not send any access connectivity establishment request.

In this embodiment, if the indication information judging unit 1501 receives neither the selection failure information nor the non-authorization indication information, it indicates that the network device has selected a multi-access-enabled data gateway to serve the current UE. Therefore, after the UE uses the multi-access function to switch part of services on the PDN connection to a 3GPP network, the remaining services not switched to the 3GPP network can also keep in normal communication, and the normal communication can be continued without interruption.

Persons of ordinary skill in the art should understand that all or part of the steps of the methods in the embodiments of the present invention may be implemented by a program instructing relevant hardware. The program may be stored in a computer readable storage medium. The storage medium may be a Read Only Memory (ROM), a Random Access Memory (RAM), a magnetic disk, or a Compact Disk-Read Only Memory (CD-ROM).

A multi-network access control method, a communication system, and relevant devices provided in the embodiments of the present invention are described in detail. Although the principles and implementation modes of the invention are described through some exemplary embodiments, the embodiments are intended to make the methods and principle of the present invention understandable, and the invention is not limited to such embodiments. Meanwhile, it is apparent that those of ordinary skill in the art can make modifications and variations to the invention without departing from the spirit and scope of the invention. The invention is intended to cover the modifications and variations provided that they fall within the protection scope of protection defined by the following claims or equivalents thereof.

What is claimed is:

1. A multi-network access control method, comprising:
receiving by a User Equipment (UE) wherein the UE is multi-access-enabled, multi-access indication information sent by an access node, wherein the multi-access indication information indicates whether a data gateway supports a multi-access function, wherein the multi-access function comprises a function which enables a first set of services being visited by the UE through the data gateway via a non-3GPP access network while a second set of services being visited by the UE through the data gateway via a 3GPP access network;
determining by the UE, whether the data gateway supports the multi-access function according to the received multi-access indication information sent by the access node; and
if so, based on the received multi-access indication information, while the UE visiting at least two services through the data gateway via the non-3GPP access network, initiating by the UE, an access connectivity establishment to access the 3GPP access network in order to switch a part of the at least two services to the 3G access network to be visited through the data gateway while a remaining part of the at least two services is retained in the non-3GPP access network and visited through the data gateway.

2. The method according to claim 1, wherein:
before the UE receives the multi-access indication information sent by the access node, the method further comprises:
requesting, by the UE, the multi-access indication information from the access node.

3. The method according to claim 2, wherein:
the requesting, by the UE, the multi-access indication information from the access node, comprises:
sending, by the UE, a request message to the access node to request the access node to feed back the multi-access indication information;
wherein the multi-access indication information is obtained by the access node and sent to the UE by the access node in response to the request message.

4. The method according to claim 3, wherein:
the multi-access indication information is information about multi-access capability of the data gateway, the information about multi-access capability of the data gateway is received by the access node and sent to the UE by the access node in response to the request message.

5. The method according to claim 3, wherein:
information about multi-access capability of the data gateway is received by the access node, the multi-access indication information is generated by the access node according to the information about multi-access capability of the data gateway, and the multi-access indication information is sent to the UE in response to the request message.

6. The method according to claim 3, wherein:

the multi-access indication information is received by the access node and sent to the UE in response to the request message.

7. The method according to claim 1, wherein:

the multi-access indication information is actively delivered by the access node when preset conditions are fulfilled.

8. A communication system, comprising:

an access node, configured to obtain multi-access indication information, and send the multi-access indication information to a User Equipment (UE), wherein the UE is multi-access-enabled, and wherein the multi-access indication information indicates whether a data gateway supports a multi-access function, wherein the multi-access function comprises a function which enables a first set of services being visited by the UE through the data gateway via a non-3GPP access network while a second set of services being visited by the UE through the data gateway via a 3GPP access network; and the UE, configured to: receive the multi-access indication information sent by the access node, determine whether the data gateway supports the multi-access function according to the received multi-access indication information sent by the access node, and if so, based on the received multi-access indication information, while the UE visiting at least two services through the data gateway via the non-3GPP access network, initiate an access connectivity establishment to access the 3GPP access network in order to switch a part of the at least two services to the 3G access network to be visited through the data gateway while a remaining part of the at least two services is retained in the non-3GPP access network and visited through the data gateway.

9. The communication system according to claim 8, wherein:

the access node is further configured to: receive an Attach Request or a Packet Data Network (PDN) Connectivity Establishment Request sent by the UE, obtain subscription information of the UE, and obtain the multi-access indication information when the subscription information indicates that the UE is authorized for multi-access.

10. The communication system according to claim 9, wherein:

the data gateway is further configured to: receive from the access node a PDN Connectivity Establishment Request message that comprises information about multi-access capability of the UE; judge, according to the information about multi-access capability of the UE, whether the UE supports the multi-access function; and send the multi-access indication information to the access node if the UE supports the multi-access function, wherein the multi-access indication information is carried in a PDN Connectivity Establishment Accept message.

11. A User Equipment (UE) which is multi-access enabled, comprising:

an information receiving unit, configured to receive multi-access indication information sent by an access node, wherein the multi-access indication information indicates whether a data gateway supports a multi-access function, wherein the multi-access function comprises a function which enables a first set of services being visited by the UE through the data gateway via a non-3GPP access network while a second set of the services being visited by the UE through the data gateway via a 3GPP access network;

an information checking unit, configured to determine whether the data gateway supports the multi-access function according to the received multi-access indication information sent by the access node; and if so based on the received multi-access indication information, a multi-network access unit, configured to, while the UE visiting at least two services through the data gateway via the non-3GPP access network, initiate an access connectivity establishment to access the 3GPP access network in order to switch a part of the at least two services to the 3G access network to be visited through the data gateway while a remaining part of the at least two services is retained in the non-3GPP access network and visited through the data gateway.

12. The UE according to claim 11, further comprising:

a request sending unit, configured to: send a request message to the access node, wherein the request message carries information about multi-access capability of the UE or an indication of requesting multi-access indication information, wherein the information about multi-access capability of the UE or the indication of requesting multi-access indication information is used to request the access node to feed back the multi-access indication information.

* * * * *